(12) United States Patent
Tongue et al.

(10) Patent No.: US 10,604,195 B2
(45) Date of Patent: Mar. 31, 2020

(54) SYSTEM AND APPARATUS FOR REDUCING THE AERODYNAMIC DRAG OF A VEHICLE

(71) Applicants: Stephen Edward Tongue, Hampden, MA (US); Richard Andrew Himmelmann, Beloit, WI (US); Joseph R. Hamm, Monson, MA (US)

(72) Inventors: Stephen Edward Tongue, Hampden, MA (US); Richard Andrew Himmelmann, Beloit, WI (US); Joseph R. Hamm, Monson, MA (US)

(73) Assignee: STREAMLINERS, INC., Monson, MA (US)

(*) Notice: Subject to any disclaimer, the term of this patent is extended or adjusted under 35 U.S.C. 154(b) by 172 days.

(21) Appl. No.: 15/651,185

(22) Filed: Jul. 17, 2017

(65) Prior Publication Data

US 2018/0015966 A1  Jan. 18, 2018

Related U.S. Application Data

(60) Provisional application No. 62/363,689, filed on Jul. 18, 2016, provisional application No. 62/506,000, filed on May 15, 2017.

(51) Int. Cl.
*B62D 35/00* (2006.01)
*B62D 35/02* (2006.01)

(52) U.S. Cl.
CPC ........... *B62D 35/001* (2013.01); *B62D 35/02* (2013.01); *Y02T 10/82* (2013.01); *Y02T 10/88* (2013.01)

(58) Field of Classification Search
CPC ...... B62D 35/01; B62D 35/004; B62D 35/02; B62D 35/001

USPC ....................................................... 296/180.4
See application file for complete search history.

(56) References Cited

U.S. PATENT DOCUMENTS

| | | | |
|---|---|---|---|
| 5,921,617 A | 7/1999 | Loewen et al. | |
| 8,251,436 B2* | 8/2012 | Henderson | B62D 35/001 296/180.4 |
| 8,322,778 B1* | 12/2012 | Pfaff | B62D 35/001 296/180.4 |
| 9,283,997 B2 | 3/2016 | Wiegel | |
| 2003/0057736 A1 | 3/2003 | Long et al. | |
| 2008/0303309 A1* | 12/2008 | Dayton | B62D 35/001 296/180.1 |
| 2010/0066123 A1* | 3/2010 | Ortega | B62D 35/001 296/180.4 |
| 2015/0061318 A1* | 3/2015 | Kibler | B62D 35/001 296/180.4 |
| 2015/0217814 A1 | 8/2015 | Wiegel | |
| 2015/0239513 A1* | 8/2015 | Lofton | B62D 35/02 296/180.4 |

(Continued)

*Primary Examiner* — Jason S Morrow
(74) *Attorney, Agent, or Firm* — Grogan, Tuccillo & Vanderleeden, LLP

(57) ABSTRACT

A vehicle includes a trailer, a tandem configured for attachment to the trailer, the tandem including at least a first axle having opposed left and right ends and at least one tire mounted to each of the left end and the right end, and a second axle rearward of the first axle and having opposed left and right ends and at least one tire mounted to each of the left end and the right end, and at least one forward air deflector mounted to the tandem forward of the tires of the first axle and being shaped so as to deflect air flow beneath the trailer laterally around the tires of the vehicle to reduce the aerodynamic drag of the vehicle.

16 Claims, 34 Drawing Sheets

(56) References Cited

U.S. PATENT DOCUMENTS

2016/0052566 A1* 2/2016 Bacon ............... B62D 35/001
 296/180.4
2016/0059910 A1* 3/2016 Durand ............. B62D 35/001
 296/180.4
2017/0349224 A1* 12/2017 Logounov .......... B62D 35/001

* cited by examiner

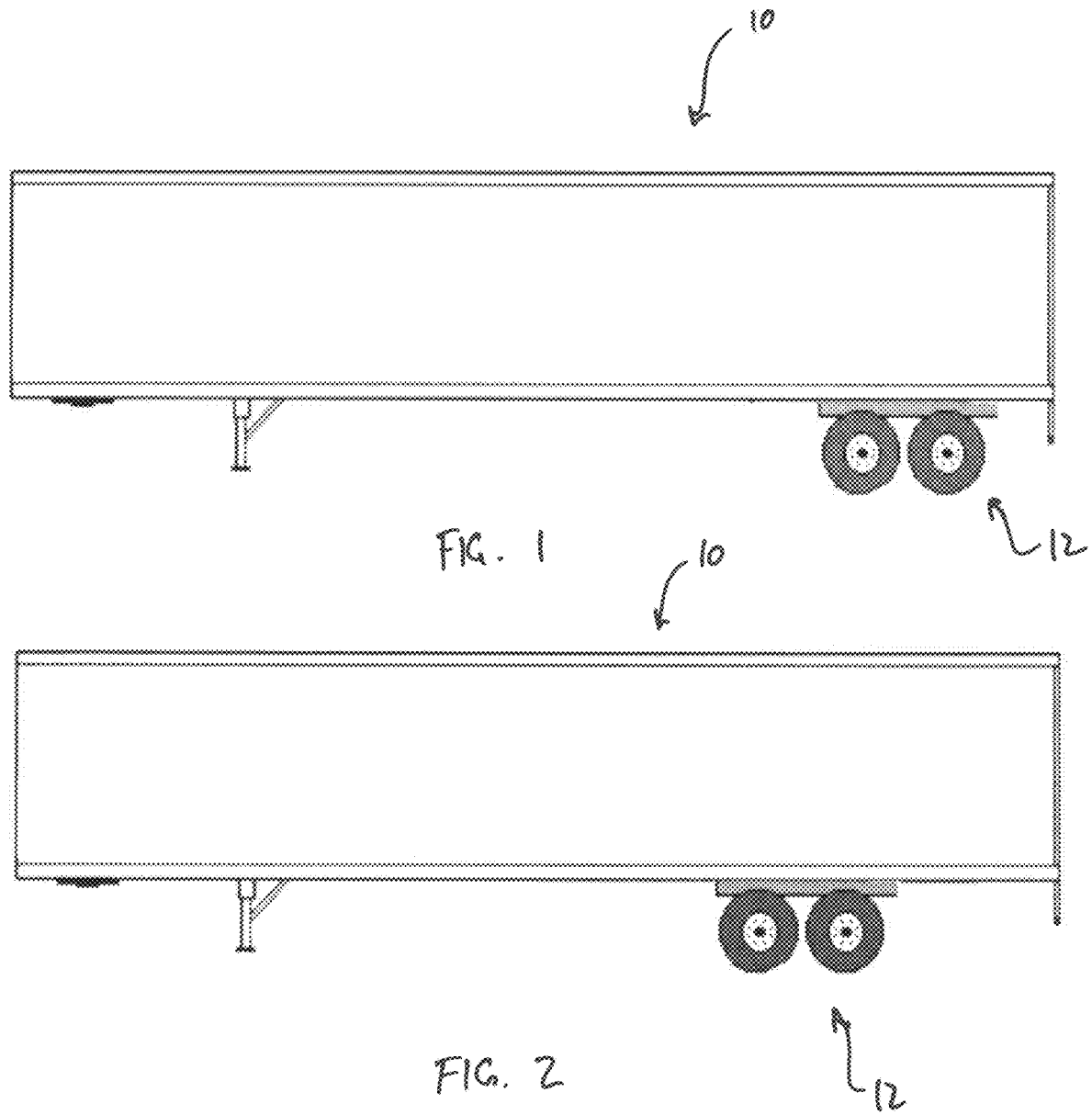

SYSTEM AND APPARATUS FOR REDUCING THE AERODYNAMIC DRAG OF A VEHICLE

CROSS-REFERENCE TO RELATED APPLICATIONS

This application claims the benefit of U.S. Provisional Application Ser. Nos. 62/363,689, filed on Jul. 18, 2016, and 62/506,000, filed on May 15, 2017, both of which are herein incorporated by reference in their entireties.

FIELD OF THE INVENTION

The present invention relates generally to an apparatus for reducing the aerodynamic drag of a vehicle and, more particularly, to an air deflector for directing air flow around drag-producing components, such as wheels, of a vehicle.

BACKGROUND OF THE INVENTION

There are millions of cars and trucks on the roads today, used for both personal passenger transport and the movement of goods, most of which rely on fossil fuel for propulsion. In the case of standard tractor trailers, at highway speeds, aerodynamic drag is responsible for approximately half of the vehicle's fuel burn, meaning that even slight reductions in aerodynamic drag can result in a significant improvement in fuel economy and annual savings in fuel cost.

There are several physical areas on tractor trailers that account for the most significant portion of aerodynamic drag, and thus fuel usage. In the case of class 8 semi trailers, the more perpendicular and vertical front areas such as the radiator grill and windshield are significant, along with the gap between the tractor and trailer, as well as the rear doors. Even the mirrors, which are small relative to the overall vehicle size, contribute about 5% of the total drag of the vehicle, as their blunt shape is not aerodynamically efficient.

In addition, the rear tires of the trailer, also referred to as tandems, contribute significantly to the overall aerodynamic drag. In particular, during vehicle travel, the airflow under the trailer strikes the rear tires at nearly full speed and results in significant aerodynamic drag on the vehicle. Drag on the rear tires and undercarriage can account for approximately 10% of the total vehicle drag. In the case of tractor trailers and intermodal chassis trailers, the more perpendicular and vertical front areas such as the radiator grill and windshield area are significant, along with the gap between the tractor and container and rear container doors.

Existing solutions for reducing drag due to physical components under the trailer, namely, drag resulting from the rear tires, include the use of trailer skirts, which have become increasingly more common. The goal of such trailer skirts is to prevent airflow from entering the area under the trailer and impacting the rear tires, axles and brakes which, over the course of an average year of long haul driving, can be a significant contributor to fuel cost. Notably, however, trailer skirts can be quite costly and can be somewhat complex to properly install, at least partially negating the annual fuel cost benefit achieved by their use. In addition, commonly used skirts for standard semi-trailers are incompatible with intermodal chassis trailers and tankers due to the lack of a convenient place to mount the long, straight skirts.

In view of the above, there is a need for a simple, cost effective apparatus or device for reducing the aerodynamic drag of a vehicle, and more particularly, the drag associated with the rear tires, axles and brakes of a vehicle such as a tractor trailer, intermodal chassis trailer, tanker truck and the like.

SUMMARY OF THE INVENTION

In view of the foregoing, it is an object of the present invention to provide an apparatus that is configured to minimize the aerodynamic drag of a vehicle, such as a semi trailer, intermodal chassis trailer, tanker truck or the like.

It is another object of the present invention to provide an apparatus that is configured to minimize the aerodynamic drag of a vehicle and which maintains a fixed position with respect to the rear tires of the vehicle regardless of a position of the rear tires along a length of the vehicle.

It is another object of the present invention to provide an apparatus that is configured to minimize the aerodynamic drag of a vehicle that is easy to install.

It is another object of the present invention to provide an apparatus that is configured to minimize the aerodynamic drag of a vehicle that can be selectively deployed.

These and other objects are achieved by the present invention.

According to an embodiment of the present invention, a vehicle includes a trailer, a tandem configured for attachment to the trailer, the tandem including at least a first axle having opposed left and right ends and at least one tire mounted to each of the left end and the right end, and a second axle rearward of the first axle and having opposed left and right ends and at least one tire mounted to each of the left end and the right end, and at least one forward air deflector mounted to the tandem forward of the tires of the first axle and being shaped so as to deflect air flow beneath the trailer laterally around the tires of the vehicle to reduce the aerodynamic drag of the vehicle.

According to another embodiment of the present invention, a system for reducing the aerodynamic drag of a vehicle includes at least one forward air deflector configured for attachment to a tandem of the vehicle, the tandem including at least a first axle having opposed left and right ends and at least one tire mounted to each of the left end and the right end, and a second axle rearward of the first axle and having opposed left and right ends and at least one tire mounted to each of the left end and the right end. The at least one leading air deflector is positionable forward of the tires of the first axle and is shaped so as to deflect a flow of air laterally around the tires of the vehicle to reduce aerodynamic drag.

According to yet another embodiment of the invention, an apparatus for reducing the aerodynamic drag of a vehicle, having a trailer and a tandem configured for attachment to the trailer, includes an air deflector having a nose and trailing edges located rearward of and spaced laterally from the nose and a mounting mechanism attached to the air deflector and providing a means of attaching the air deflector to the tandem of the vehicle. The air deflector is positionable upwind from rear tires of the vehicle and is configured to deflect a flow of air laterally around the rear tires of the vehicle to reduce aerodynamic drag of the vehicle. The air deflector maintains a fixed position relative to the rear tires of the vehicle regardless of a position of the tandem on the trailer of the vehicle

BRIEF DESCRIPTION OF THE DRAWINGS

The present invention will be better understood from reading the following description of non-limiting embodiments, with reference to the attached drawings, wherein below:

FIG. 1 is a simplified schematic illustration of a typical semi trailer, showing rear tandems in a rear position.

FIG. 2 is a simplified schematic illustration of a typical semi trailer, showing rear tandems in a forward position.

DETAILED DESCRIPTION OF THE PREFERRED EMBODIMENTS

Referring first to FIGS. 1 and 2, a typical semi trailer 10 having rear tandems 12 with which the apparatus for reducing aerodynamic drag of the present invention is intended to be utilized, is shown. As is known in the art, the tandems 12 can be moved forward or aft on the trailer 10 based on weight and position of the cargo inside the trailer. For example, FIG. 1 shows the rear tandems 12 in a rear position, while FIG. 2 shows the rear tandems 12 and in a forward position.

Ignored for years, the rear tandems of semi trailers have been the recent focus of aerodynamic improvement attempts in the industry through the use of trailer skirts, which attempt to minimize or prevent airflow from entering the underside of the trailer to reduce aerodynamic drag on the rear tandems (or tires). One drawback, however, is that these skirts are very expensive to install and therefore are large costs to fleet owners and have associated long payback periods. In addition, depending on the positioning of the tandems along the trailer, the effectiveness of trailer skirts in preventing the incursion of wind into the underside of the trailer and impact with the tandems can vary significantly.

Figure 4:
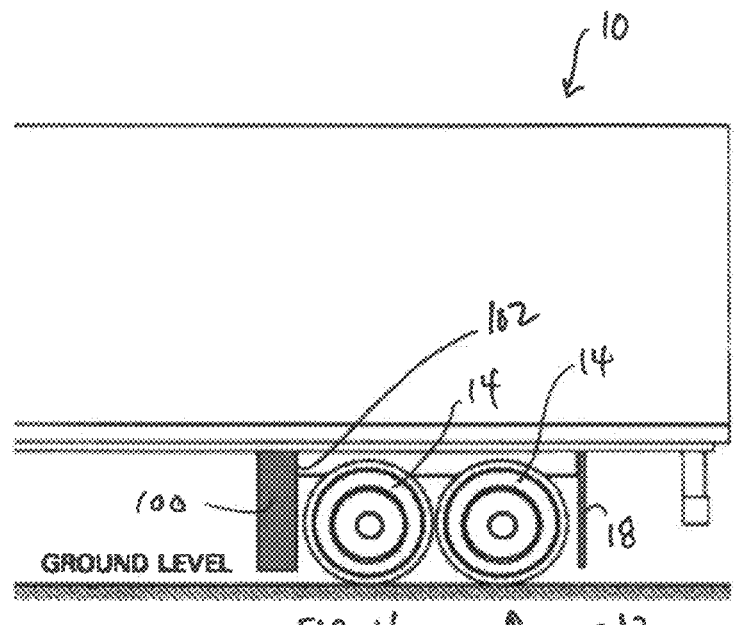
FIG. 4 is a side, elevational view of the apparatus of FIG. 3, illustrating one possible profile shape for the apparatus.
Figure 5:
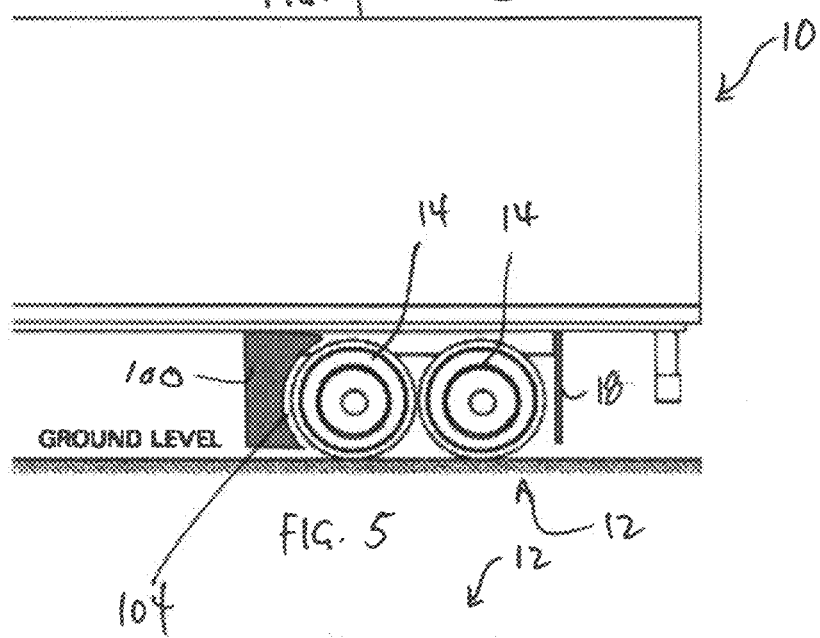
FIG. 5 is a side, elevational view of the apparatus of the present invention, illustrating another possible profile shape for the apparatus.
Figure 3:
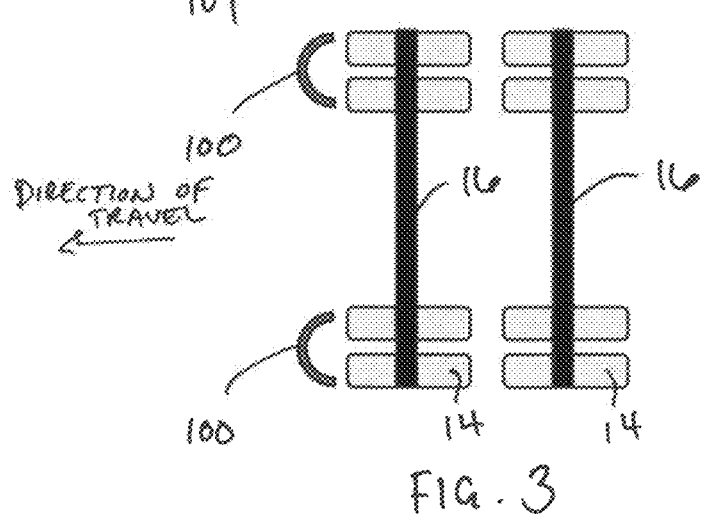
FIG. 3 is a simplified, top plan view of an apparatus for reducing the aerodynamic drag of a vehicle according to an embodiment of the present invention, shown in position forward of the rear tandems of the vehicle.

Turning now to FIG. 3, the present invention is directed to an apparatus for reducing the aerodynamic drag of a vehicle from the rear tandems, axel, brake lines, etc., which is substantially equally effective regardless of the position of the rear tandems along the body of the trailer. As illustrated in FIG. 3, the apparatus takes the form of air deflectors 100 that are attached to the tandems 12 so that they move with the tires 14. This allows the deflectors 100 to remain a fixed distance from the rear tire and provide maximum aerodynamic benefit. As best shown in FIGS. 3-5, the deflectors 100 have an aerodynamic shape and are attached to the tandems 12 so that they hang directly in front of the rear tires 14 and axles 16 to more effectively deflect airflow around the tires. As shown therein, for example, the deflectors 100 may be substantially arcuate or bowed in shape.

FIGS. 4 and 5 illustrate two possible profile shapes for the deflectors. As shown in FIG. 4, for example, the deflectors 100 may have a substantially straight trailing edges 102 on opposed sides of the deflector. Alternatively, FIG. 5 shows deflectors 100 having curved trailing edges 104 that are tailored to the shape of the tires 14. In an embodiment, the exact shape of the deflectors 100 may depend on desired aerodynamic performance and cost of manufacture. In an embodiment, the deflectors 100 can hang like a mud flap and be made of a flexible material such as rubber or fiber reinforced rubber. Alternatively, the deflectors 100 may also be made of a rigid material such as metal or plastic to provide the same function. Importantly, attaching the deflector to the tandems 12 provides the ability for the deflectors 100 to be located as close as practical to the rear tires 14 even as the tandems 12 are moved forward and backward under the trailer 100 for variations in cargo center of mass. As shown in FIG. 3, the deflectors 100 are located on both sides of the trailer 10 to deflect air most effectively around both sets of tires 14. The deflectors 100 can also be utilized in conjunction with standard mud flaps 18 positioned rear of the tires 14, as shown in FIGS. 4 and 5.

Figure 7:
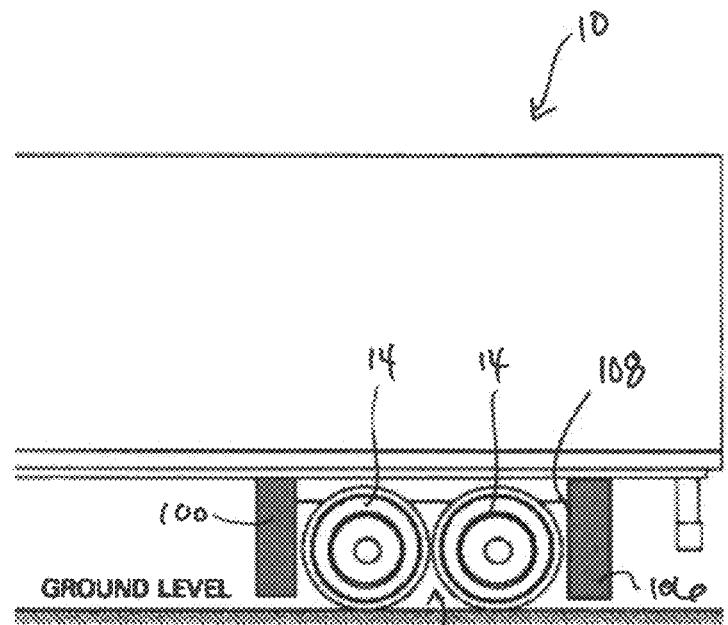
FIG. 7 is a side, elevational view of the apparatus of FIG. 6, illustrating one possible profile shape.
Figure 8:
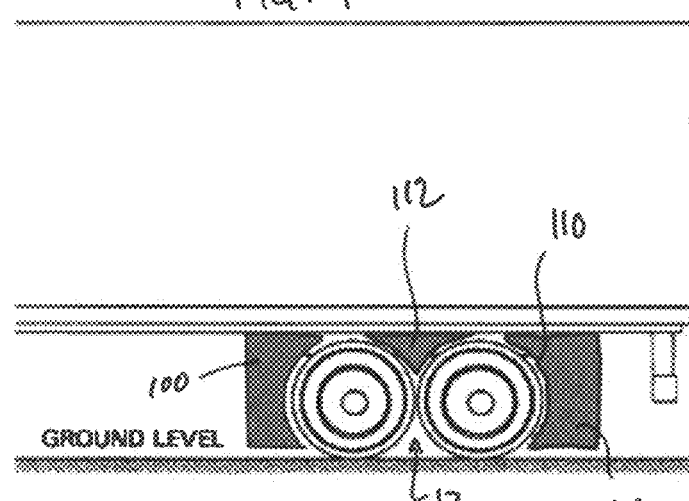
FIG. 8 is a side, elevational view of the apparatus of FIG. 6, illustrating another possible profile shape for the apparatus.
Figure 6:
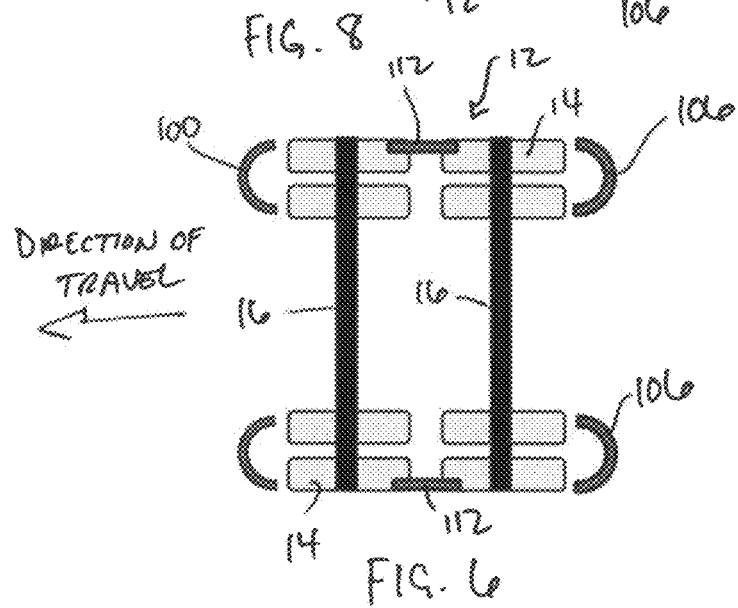
FIG. 6 is a simplified, top plan view of an apparatus for reducing the aerodynamic drag of a vehicle according to another embodiment of the present invention.

Turning now to FIGS. 6-8, in an embodiment, deflectors 106 of similar configuration may also be attached to the tandems 12 rearward of the rear tires 14 to provide further aerodynamic benefit. Like the deflectors shown in FIGS. 4 and 5, the rearward deflectors 106 may have edges 108 adjacent to the tires 14 that are substantially straight (see FIG. 7), or edges 110 that are curved and tailored to the shape of the tires 14 (see FIG. 8). In an embodiment, a plate or flap-like structure 112 may be attached to the tandems 12 between the tires, as best shown in FIGS. 6 and 8.

Figure 10:
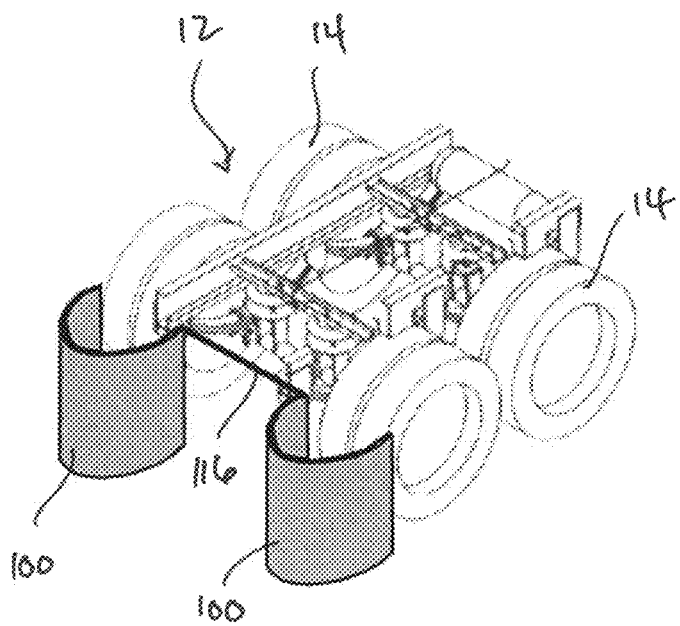
FIG. 10 is a perspective view of the apparatus of FIG. 3, illustrating one mounting configuration.
Figure 9:
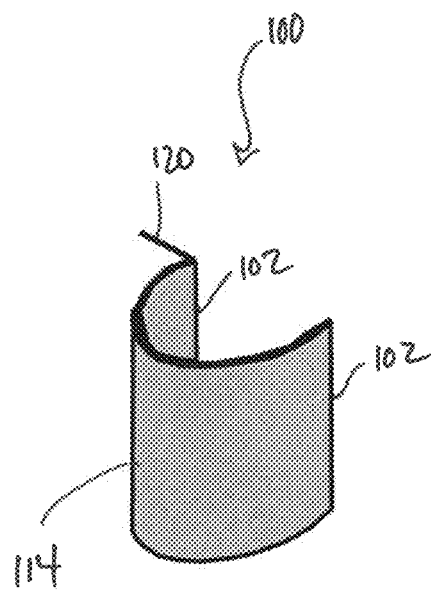
FIG. 9 is a perspective view of the apparatus of FIG. 3.
Figure 11:
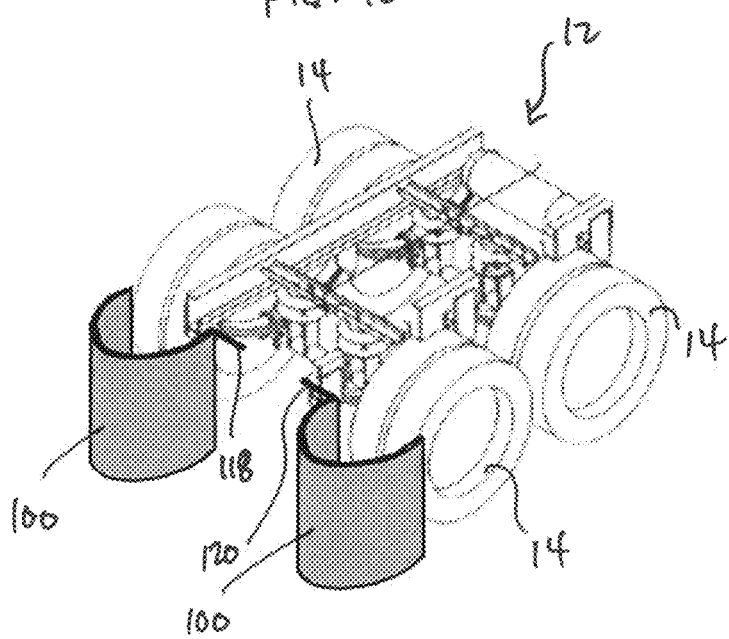
FIG. 11 is a perspective view of the apparatus of FIG. 3, illustrating another mounting configuration.

FIGS. 9-11 more clearly show the configuration of the deflectors 100 and the manner in which they are attached to the tandems 12. As shown in FIG. 9, the deflector 100 has a substantially arcuate shape defining a nose 114 and opposed trailing edges 102. As shown in FIG. 10, the pair of deflectors 100 may hang from a single mounting assembly 116 that is attached to the tandems 12 by any means known in the art. Alternatively, the pair of deflectors 100 may hang from separate mounting assemblies 118, 120 that are separately attached to the tandems 12.

Figure 13:
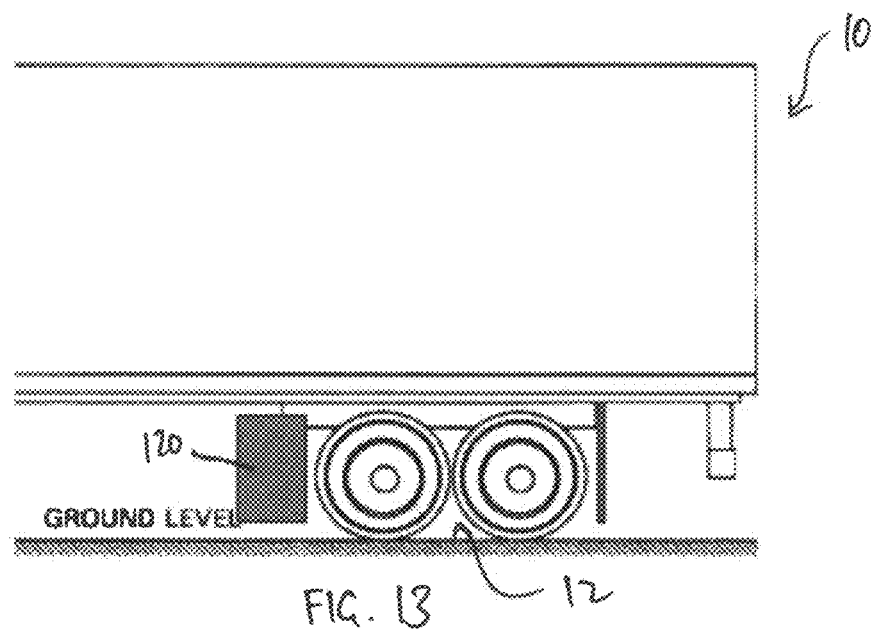
FIG. 13 is a side, elevational view of the apparatus of FIG. 12.
Figure 12:
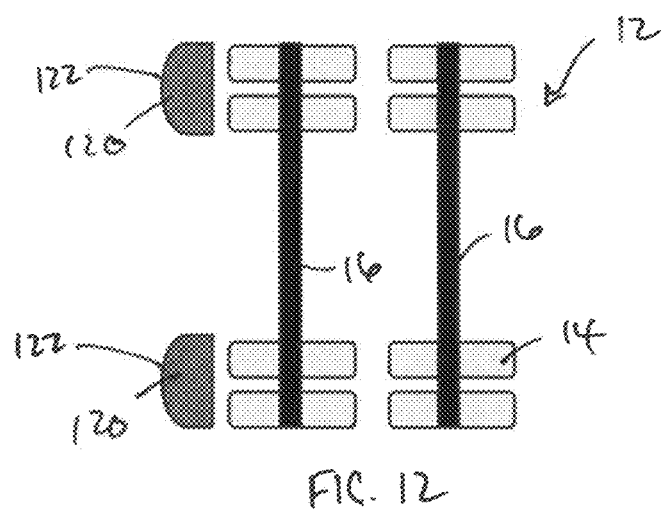
FIG. 12 is a top, plan view of an apparatus for reducing the aerodynamic drag of a vehicle according to another embodiment of the present invention.
Figure 14:
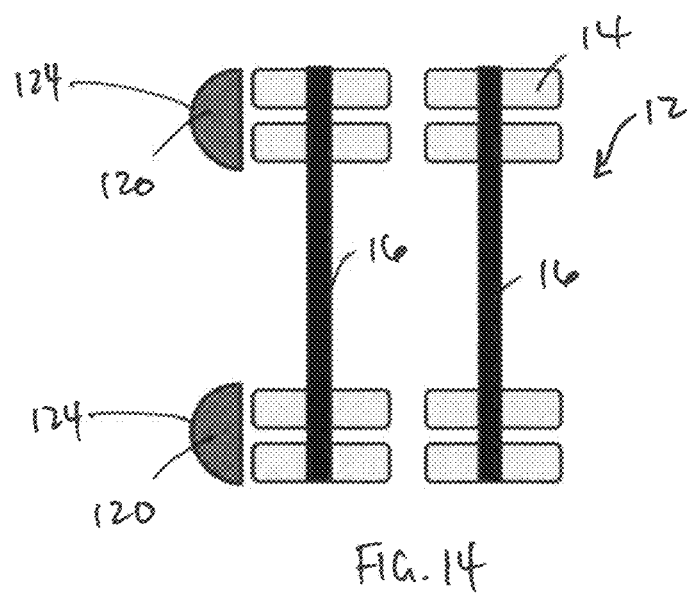
FIG. 14 is a top, plan view of an apparatus for reducing the aerodynamic drag of a vehicle according to another embodiment of the present invention.

Turning now to FIGS. 12-14, a vehicle outfitted with an air deflector 120 according to another embodiment of the invention is illustrated. As shown therein, deflector 120 forms a three-dimensional shape, bounded on all sides. This is in contrast to the deflector 100 disclosed above which is formed form a thin sheet or panel of material and which is open at the rearward end. In an embodiment, the deflectors 120 may be inflatable and deflatable and may be connected to an air source and/or vacuum source for selectively inflating and deflating the deflectors 120, as desired. In connection with the above, the deflectors 120 according to this embodiment may be made of a flexible or rigid material, and construction may be dependent on performance and cost considerations.

Figure 16:
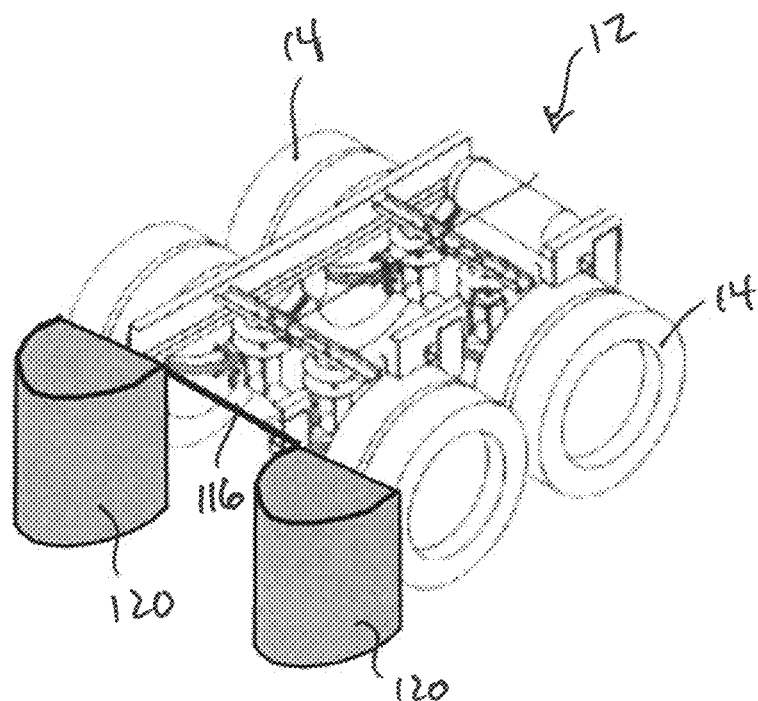
FIG. 16 is a perspective view of the apparatus of FIG. 14, illustrating one mounting configuration.
Figure 15:
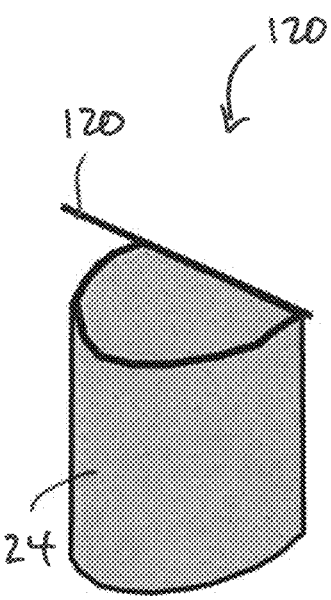
FIG. 15 is a perspective view of the apparatus of FIG. 14.
Figure 17:
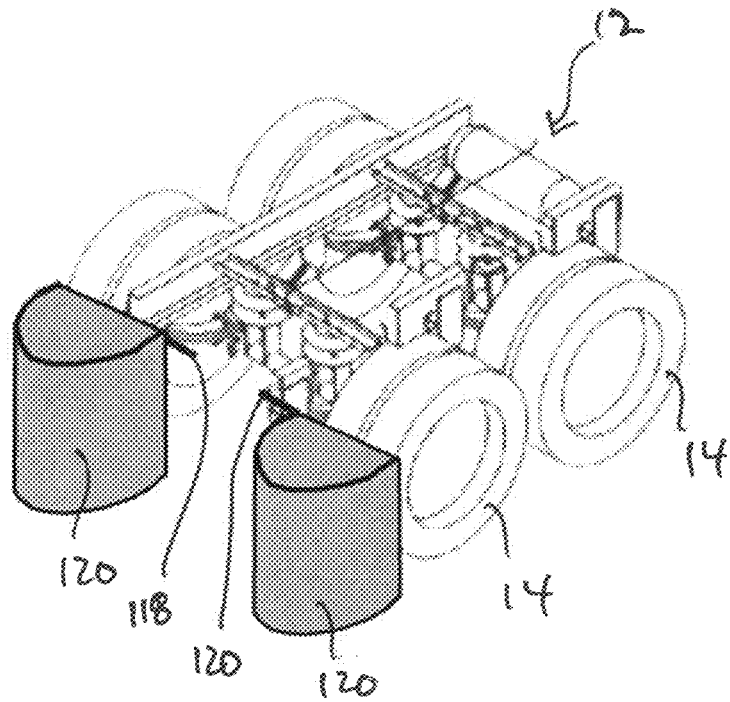
FIG. 17 is a perspective view of the apparatus of FIG. 14, illustrating another mounting configuration.

As illustrated in FIGS. 12 and 14, the deflectors 120 may take a variety of aerodynamic shapes. For example, the deflectors 120 may have a bull nose 122 (FIG. 12) or a semi-circular nose 124 (FIG. 14), although other shapes are possible without departing from the broader aspects of the invention. In an embodiment, the shape of the nose may be selected depending upon the desired aerodynamic performance to be achieved. Like the deflectors 100 disclosed above, the deflectors 120 may likewise be attached to the tandems 12 via a single mounting assembly 116 or by separate mounting assemblies 118, 120 that are separately attached to the tandems 12, as illustrated in FIGS. 15-17.

Figures 18, 19:
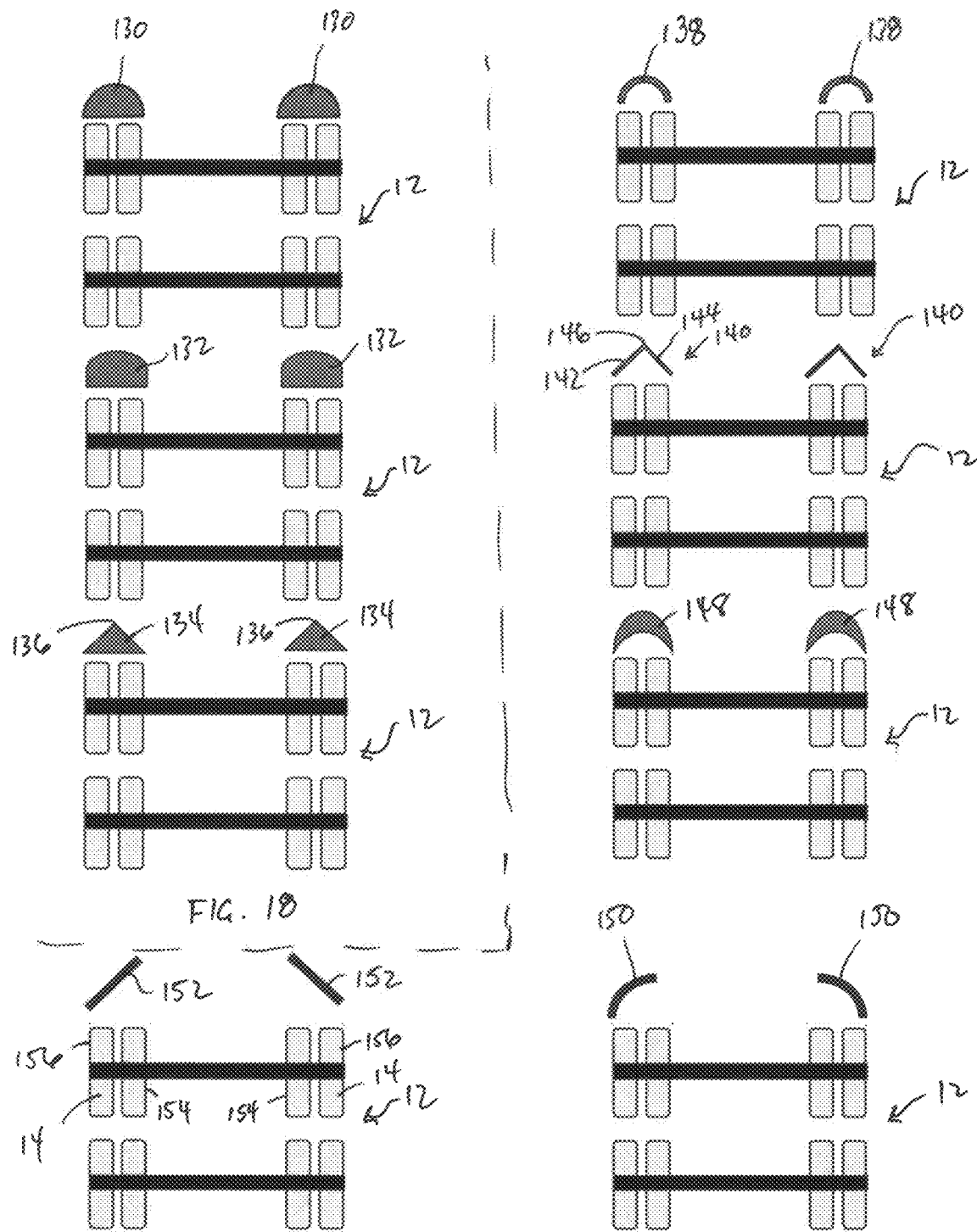
FIG. 18 is a top plan view illustrating various possible shapes for a solid, three dimensional apparatus for reducing the aerodynamic drag of a vehicle, according to an embodiment of the present invention.
FIG. 19 is a top plan view illustrating various possible shapes for a thin, flap-like apparatus for reducing the aerodynamic drag of a vehicle, according to an embodiment of the present invention.
Figure 20:
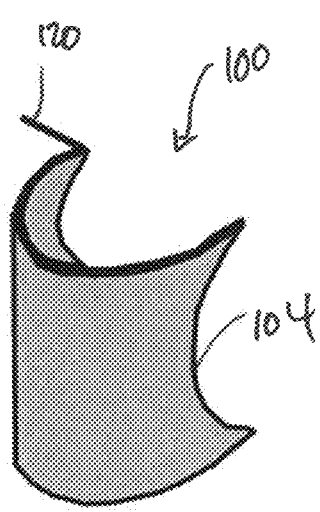
FIGS. 20-25 are perspective illustrations of the possible configurations for the thin, flap-like apparatuses shown in FIG. 19.
Figure 23:
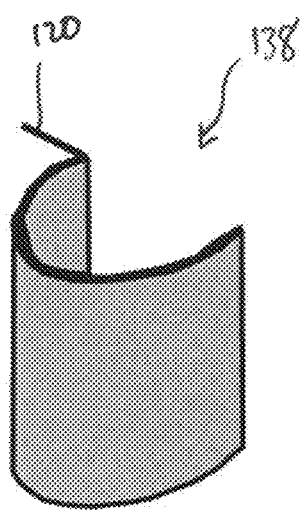
Figure 21:
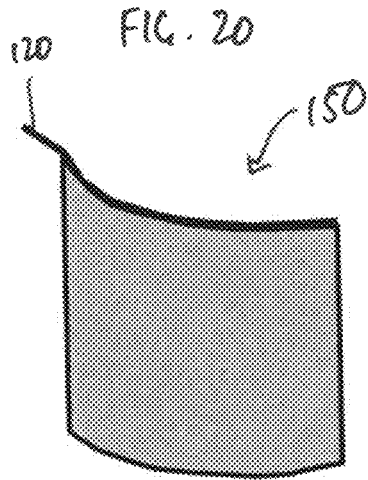
Figure 24:
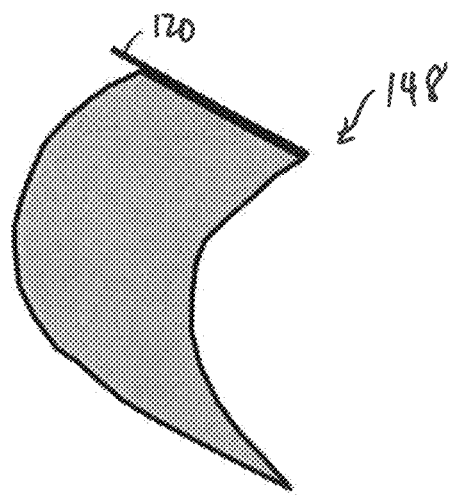
Figure 22:
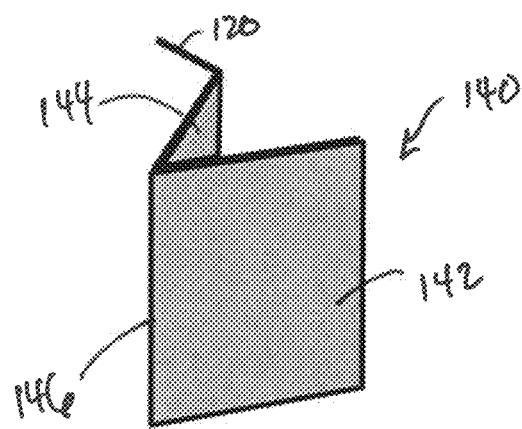
Figure 25:
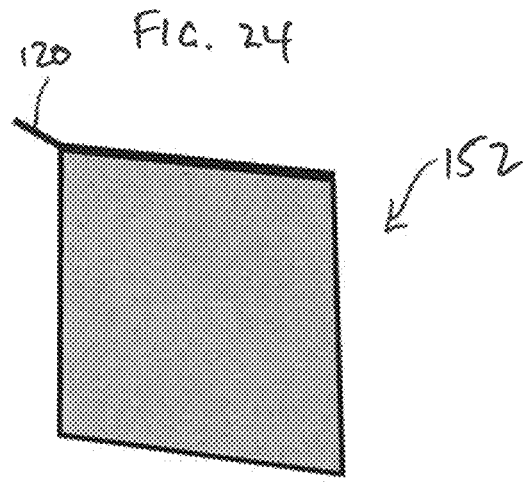
Figure 26:
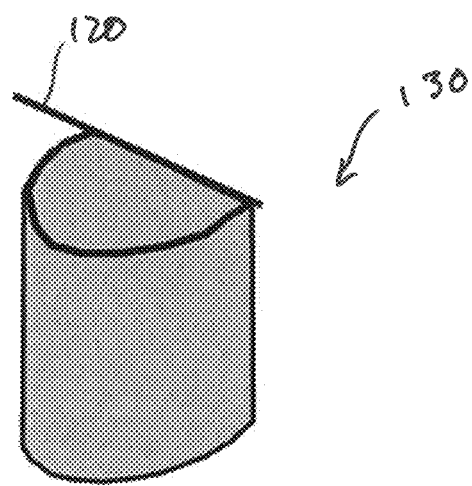
FIGS. 26-28 are perspective illustrations of the possible configurations for the solid, three dimensional apparatuses shown in FIG. 18.
Figure 27:
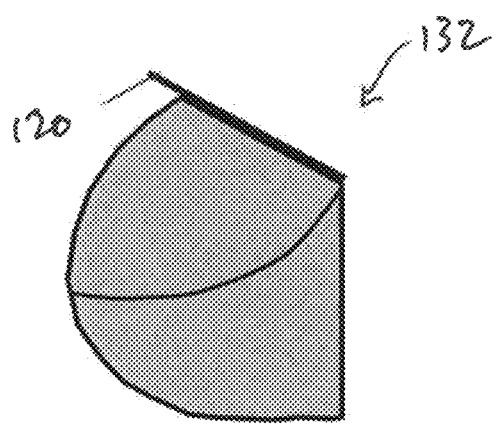
Figure 28:
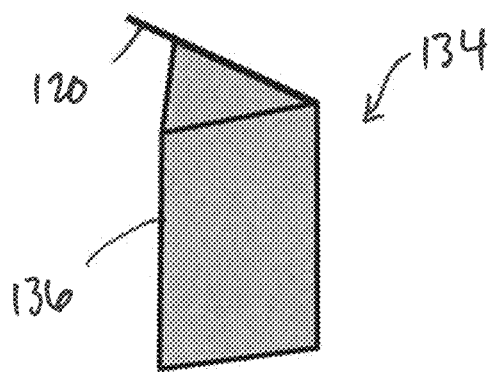
Figure 30:
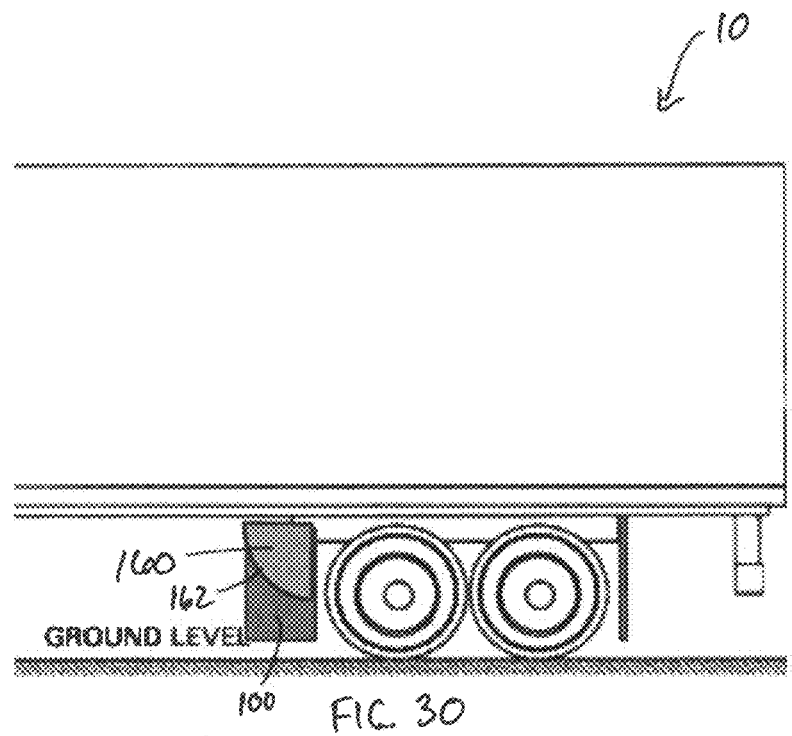
FIG. 30 is a side elevational view of the apparatus of FIG. 29, shown in position forward of the rear tandems of a vehicle.

Turning now to FIGS. 18 and 19, various possible configurations for both solid, three-dimensional deflectors (FIG. 18) and flap-like deflectors (FIG. 19) are shown. For example, as illustrated in FIG. 18, the solid, three dimensional deflectors may be semi-circular deflectors 130, bull nose deflectors 132, or triangular deflectors 134 having a sharp, leading edge 136, although other deflector shapes are also possible without departing from the broader aspects of the invention.

Moreover, as illustrated in FIG. 19, the thin, flap like deflectors may be arcuate deflectors 138, angled deflectors 140 having two leg portions 142, 144 that converge at a sharp, leading edge 146 (forming an acute angle), crescent-shaped deflectors 148, semi-circular or quadrant-shaped deflectors 150, or angled deflectors 152. In an embodiment, the angled deflectors 152 may be oriented at any angle with respect to a direction of travel of a vehicle, but preferably are angled so as to deflect air outwardly around the rear tandems/tires of the vehicle. In an embodiment, the angled deflectors 152 extend at an angle between approximately zero degrees and approximately 90 degrees with respect to an axis of travel of the vehicle, and preferable between approximately zero degrees and 45 degrees with respect to the axis of travel of the vehicle. In an embodiment, it is desirable that the angled deflectors 152 are longer than a distance measured between the innermost surface 154 of the innermost tire of the rear tandems 12 to the outermost surface 156 of the outermost tire of the rear tandems 12. This configuration ensures that the air flow beneath the trailer is diverted entirely around the rear tandems 12 and does not impact either sets of tires, the axle or other components beneath the trailer.

In an embodiment, the shape of the deflectors may be selected based on expectations for best aerodynamic performance and cost considerations. These shapes would also be placed on the tandems for optimal placement relative to the tires and would be placed on both sides of the trailer to deflect air around both sets of tires. These deflectors could be solid or hollow in construction, and also be flexible or rigid in stiffness. The material selection and configuration will be a decision based on desired performance, cost and installation requirements.

FIGS. 20-25 are perspective illustrations that better show the configuration of the thin, flap-like deflectors also shown in FIG. 19, and FIGS. 26-28 are perspective illustrations that better show the configuration of the solid and/or three-dimensional deflectors also shown in FIG. 18. As discussed above, any of the deflectors may be inflatable and deflatable and can be manufactured from flexible materials such as rubber, fiber-reinforced rubber or foam, or rigid materials such as metal, plastic or wood.

Figure 29:
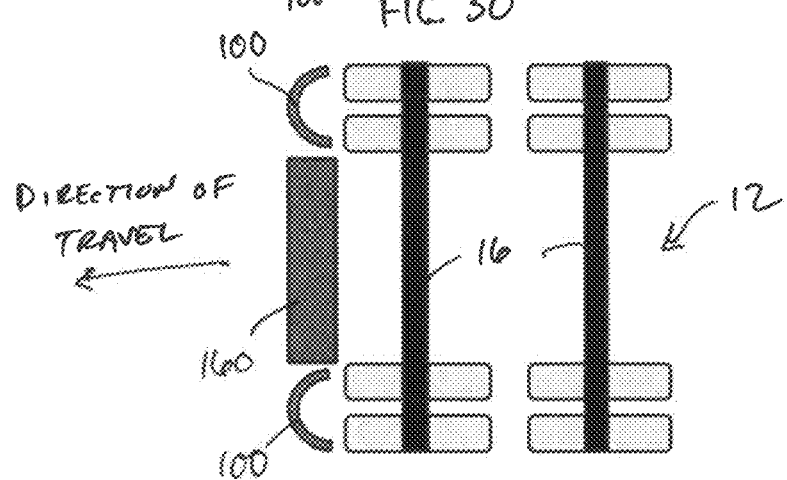
FIG. 29 is a simplified, top plan view of an apparatus for reducing the aerodynamic drag of a vehicle according to another embodiment of the present invention.
Figure 31:
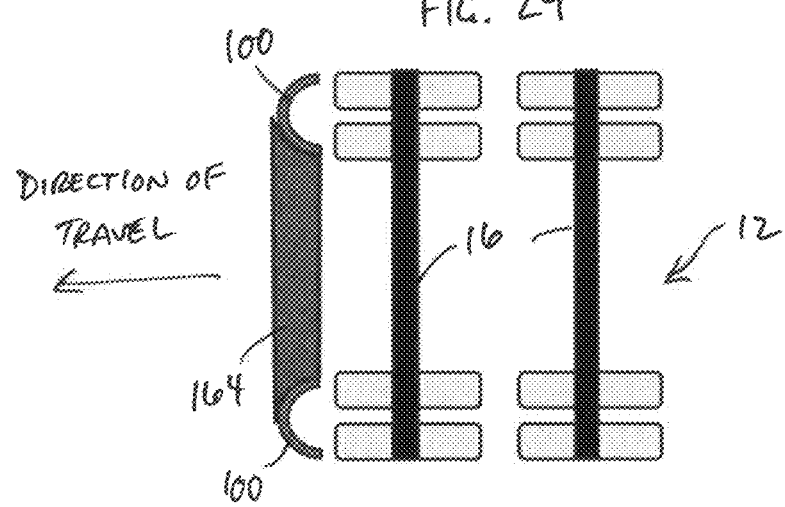
FIG. 31 is a simplified, top plan view of an apparatus for reducing the aerodynamic drag of a vehicle according to another embodiment of the present invention.

Turning now to FIGS. 29-31 and 35-39, in an embodiment, a central air deflector 160 may be employed to deflect air below the wheel axles 16 and brake assemblies (not shown) to further reduce aerodynamic drag. In an embodiment, the central deflector 160 may have and arcuate forward surface that curves downwardly and rearwardly, and which extends between the opposed deflectors 100 to direct air below the axles 16 and other components of the tandems 12. The central deflector 160 may likewise be attached to the tandems 12 to maintain optimal spacing and performance, and is hung across the center of the trailer, between the tires 14, and extend down toward the ground approximately half way, to deflect air toward the ground and away from the axles and brakes which are located between the tires. FIGS. 29 and 31 show a stand-alone center deflector 160, and a deflector 164 that is attached to the tire deflectors 100. It is contemplated that the central deflector 160 or 164 can be utilized as a stand-alone deflector, or can be used in conjunction with any of the other tire deflectors disclosed herein. The center deflector, like the tire deflectors, could be made of flexible or rigid material depending on desired performance and cost configurations.

Figure 33:
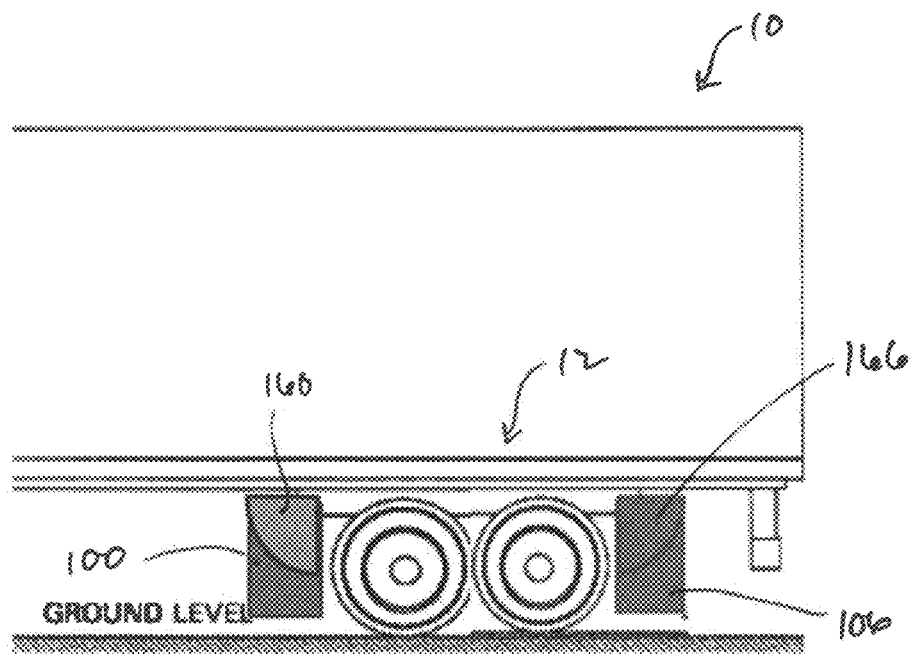
FIG. 33 is a side elevational view of the apparatus of FIG. 32, shown in position forward of the rear tandems of a vehicle.
Figure 32:
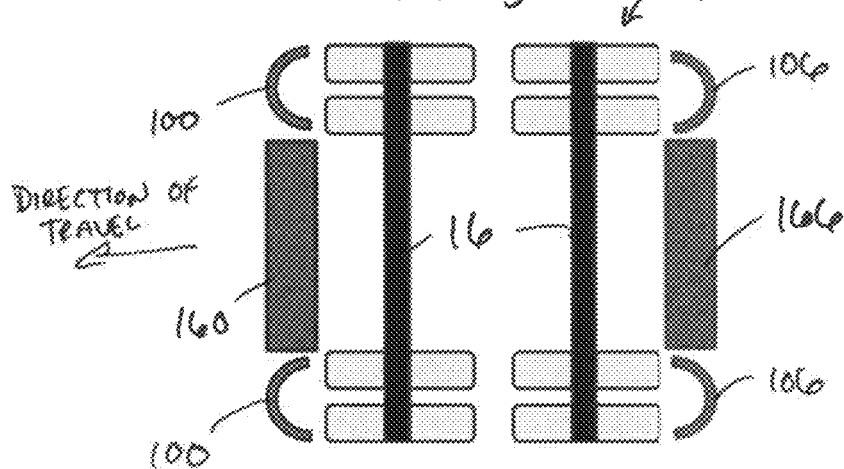
FIG. 32 is a simplified, top plan view of an apparatus for reducing the aerodynamic drag of a vehicle according to another embodiment of the present invention.
Figure 34:
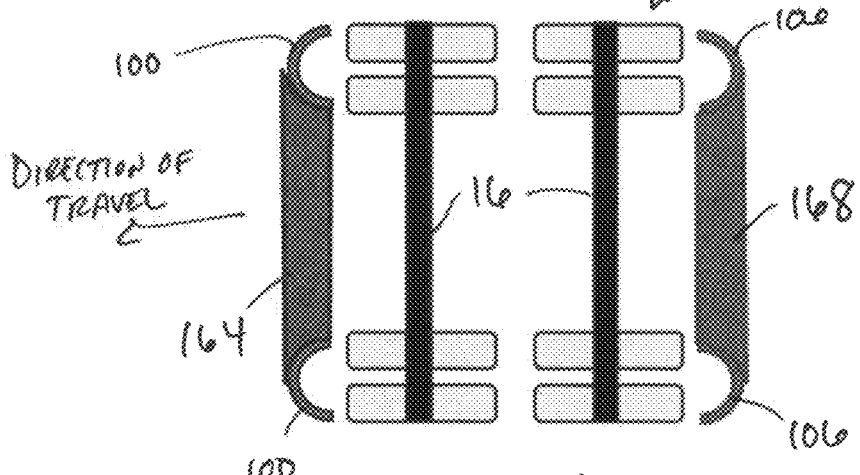
FIG. 34 is a simplified, top plan view of an apparatus for reducing the aerodynamic drag of a vehicle according to another embodiment of the present invention.
Figure 35:
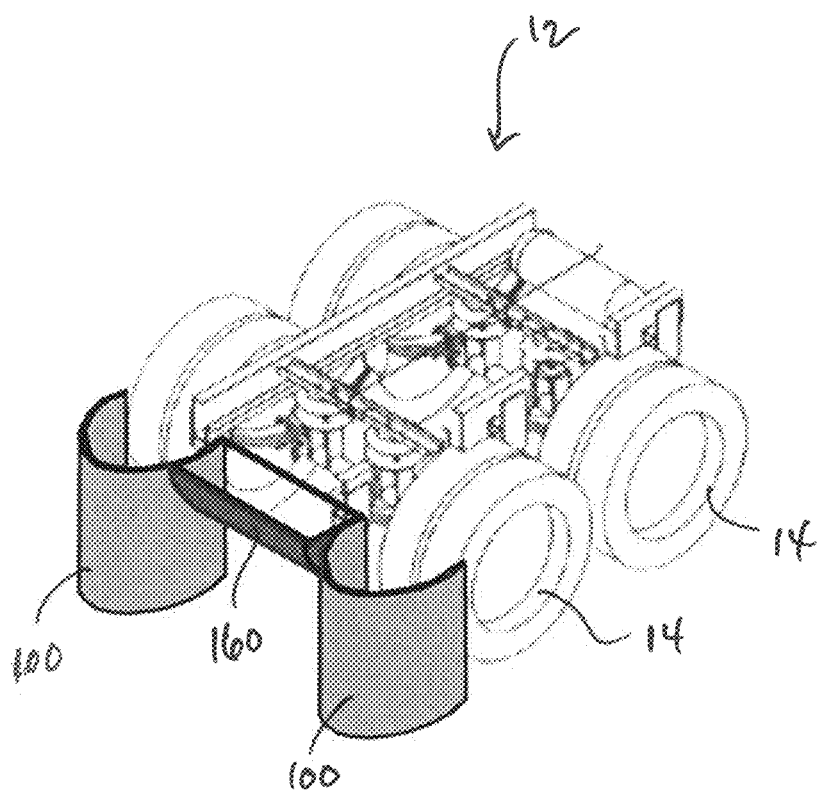
FIG. 35 is a perspective view of the apparatus of FIG. 31.
Figure 37:
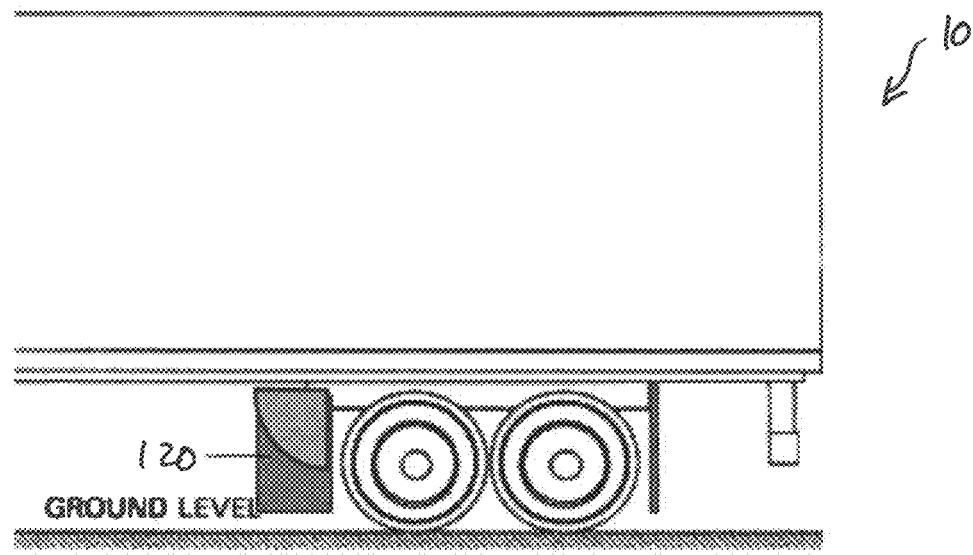
FIG. 37 is a side elevational view of the apparatus of FIG. 36, shown in position forward of the rear tandems of a vehicle.
Figure 36:
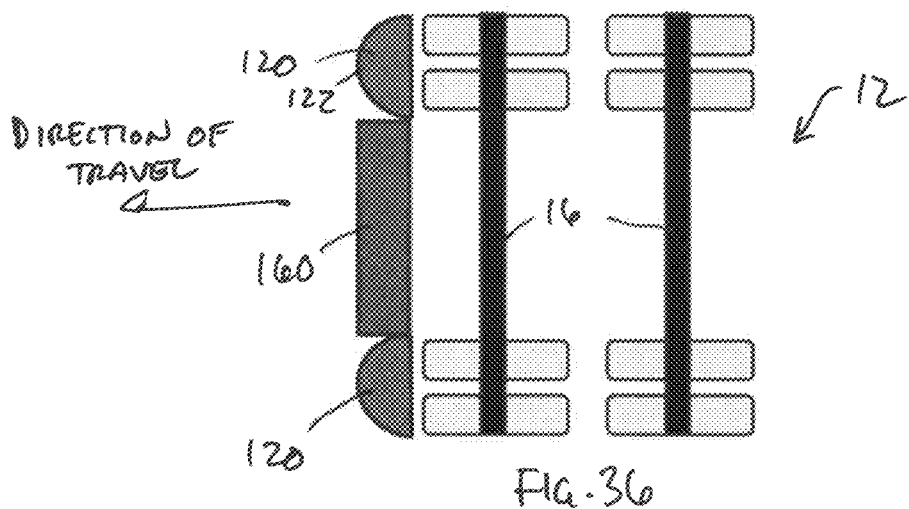
FIG. 36 is a simplified, top plan view of an apparatus for reducing the aerodynamic drag of a vehicle according to another embodiment of the present invention.
Figure 38:
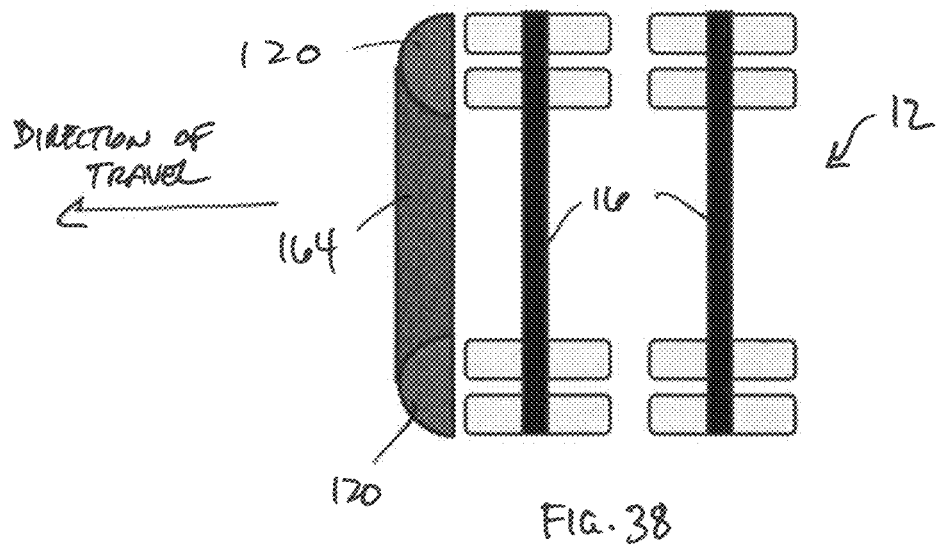
FIG. 38 is a simplified, top plan view of an apparatus for reducing the aerodynamic drag of a vehicle, according to another embodiment of the present invention.
Figure 39:
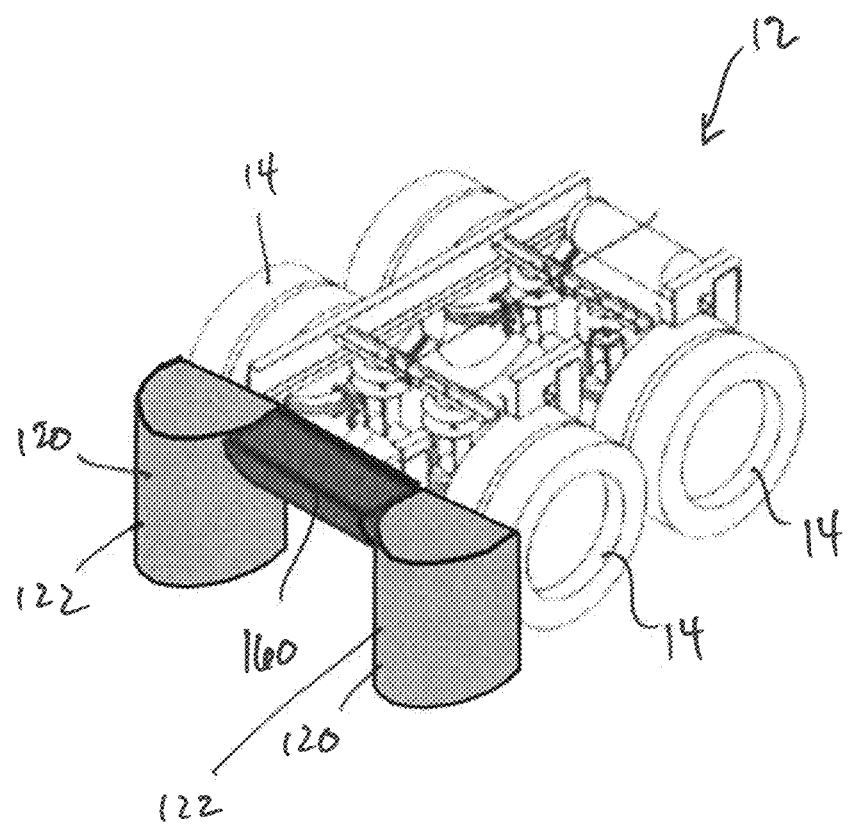
FIG. 39 is a perspective view of the apparatus of FIG. 36.
Figure 40:
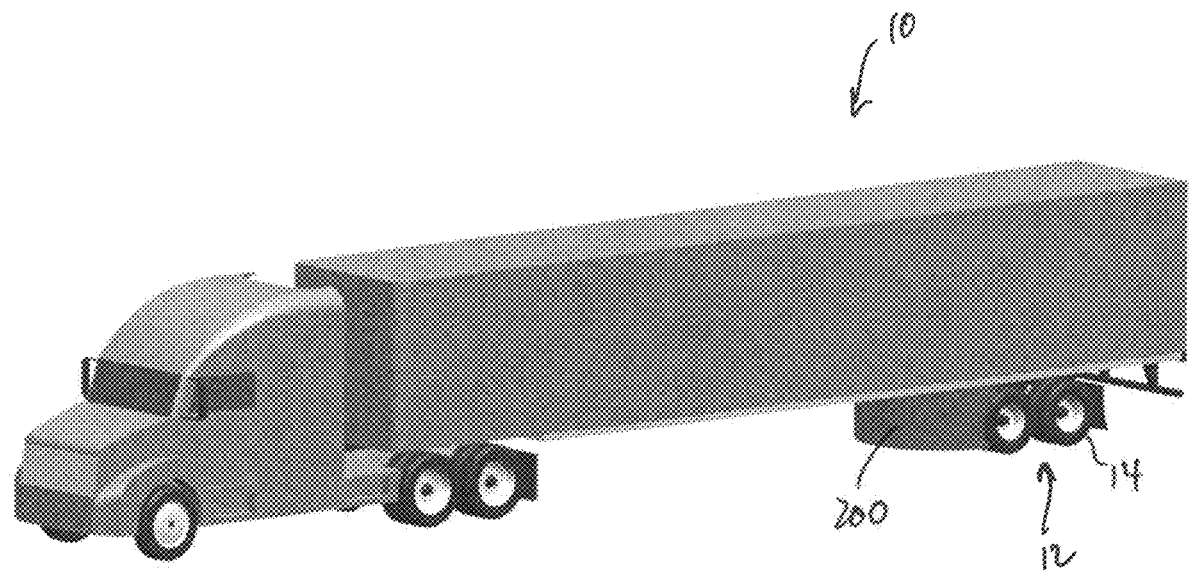
FIGS. 40 and 41 are perspective illustrations of a vehicle having an apparatus for reducing the aerodynamic drag of a vehicle, according to another embodiment of the present invention.
Figure 41:
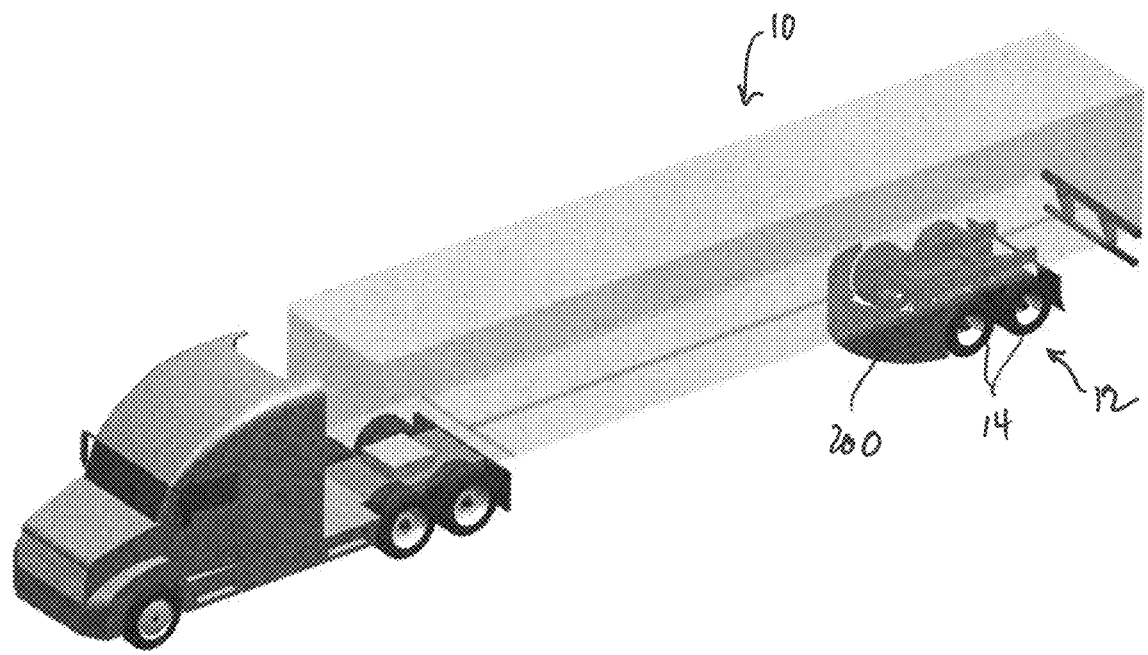
Figure 42:
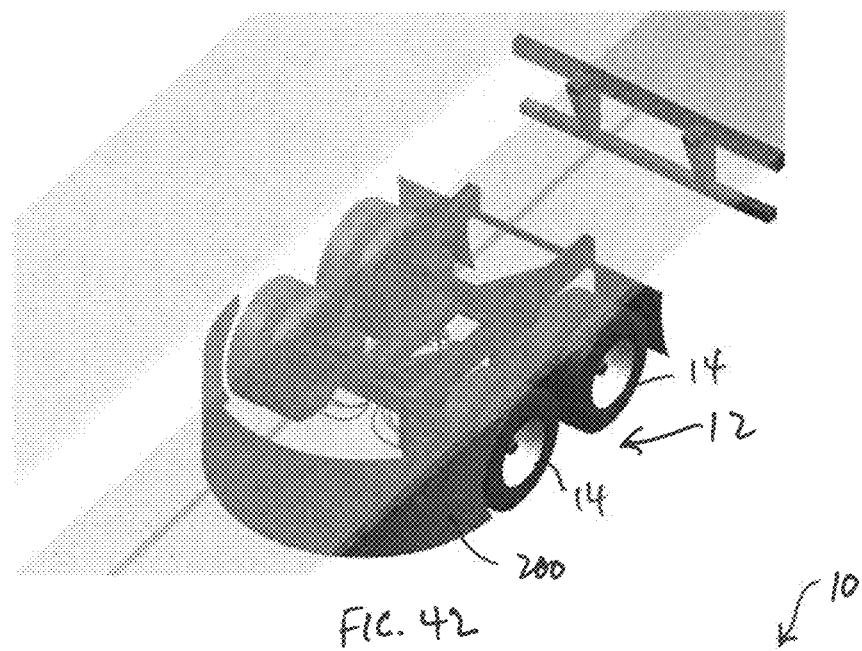
FIG. 42 is an enlarged, perspective view of the apparatus of FIGS. 40 and 41.
Figure 43:
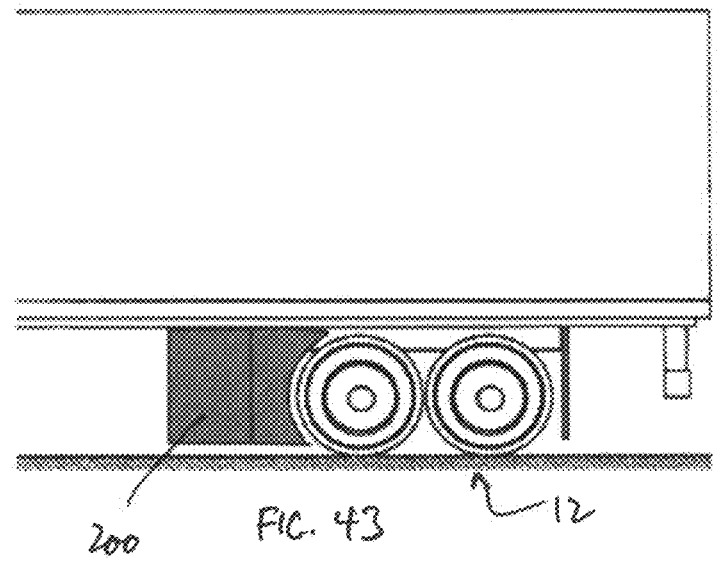
FIG. 43 is a side elevational view of the apparatus.
Figure 44:
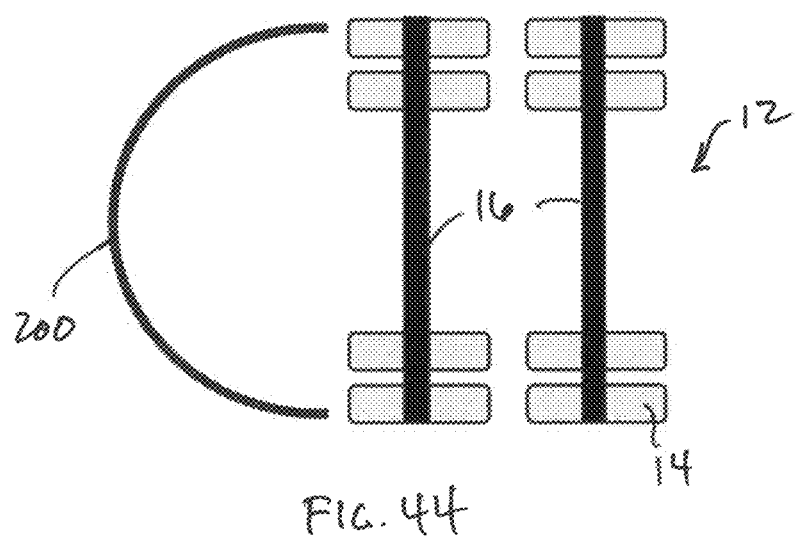
FIG. 44 is a top plan view of the apparatus.

Still further, in an embodiment, the trailer may also be outfitted with a rear or trailing central deflector 166 or 168 of a shape similar to the forward or leading central deflector 160, 164. As shown in FIGS. 32-34, the trailing central deflector 166, 168 may help to reduce drag by being positioned behind the wheel axles 16 and brake assemblies. The trailing deflector 166, 168 may likewise be attached to the tandems 12 to maintain optimal spacing and performance, and hang across the center of the trailer, between the tires, and extends down toward the ground approximately half way, reducing drag from the axles and brakes which are located between the tires. Trailing deflector 166, 168 may be used independently, or in conjunction with any of the air deflectors described herein positioned behind the rear tires and/or wheel axles and brakes. The trailing deflector 166, 168, like the tire deflectors 100, 106, could be made of flexible or rigid material depending on desired performance and cost configurations.

The central deflectors 160, 164, 166, 168 may be formed from either a thin, flap-like plate or may take a three-dimensional or solid form. In and embodiment, the central deflector(s) may be selectively inflatable and deflatable to allow more precise control of the aerodynamic drag of the vehicle.

Turning now to FIGS. 40-44, an air deflector or apparatus 200 for reducing drag on the rear tandems 12 of a vehicle 10 according to an alternative embodiment of the present invention is illustrated. In particular, rather than utilizing separate or discrete deflectors for the left and right rear tires and for the axle, brake lines, etc., an air deflector 200 in the form of a contoured curtain, skirt or air dam may be hung or secured in position in front of the entire tandem assembly 12. The air deflector 200 functions to efficiently divert air flow around the entire tandem assembly 12 and the tires 14. As illustrated therein, the air deflector may take the form of a semi-circular skirt that extends across the full width of the rear tandem (and may or may not have trailing edges that are contoured to the tires, as discussed above). Like the deflectors disclosed above, the deflector 200 may be mounted to the tandems 200 or hung from the body of the trailer 10.

Figure 45:
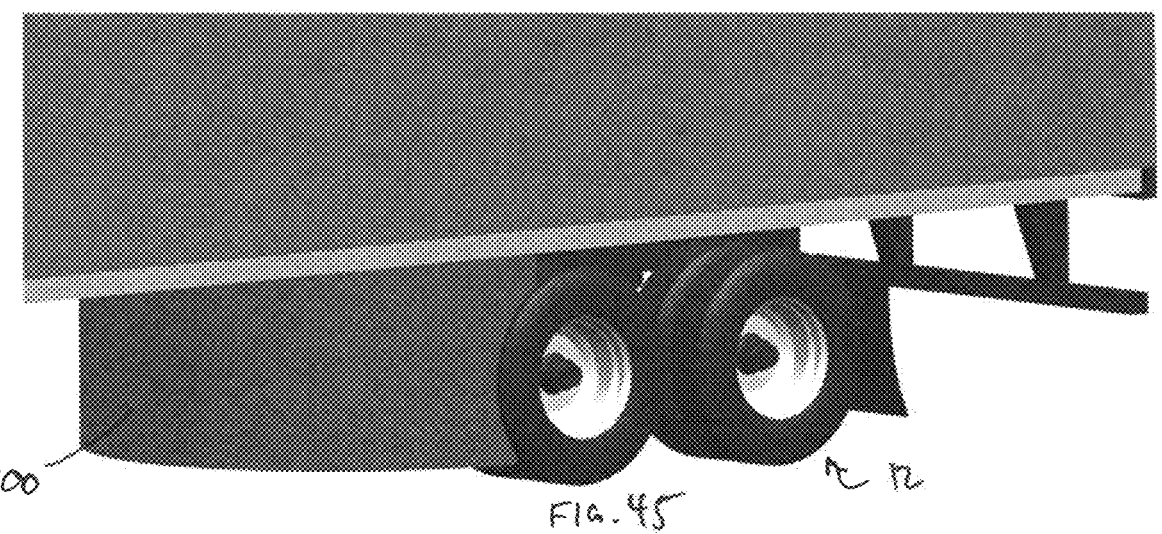
FIGS. 45-47 are enlarged perspective illustrations of alternative air deflector configurations, according to other embodiments of the invention.
Figure 46:
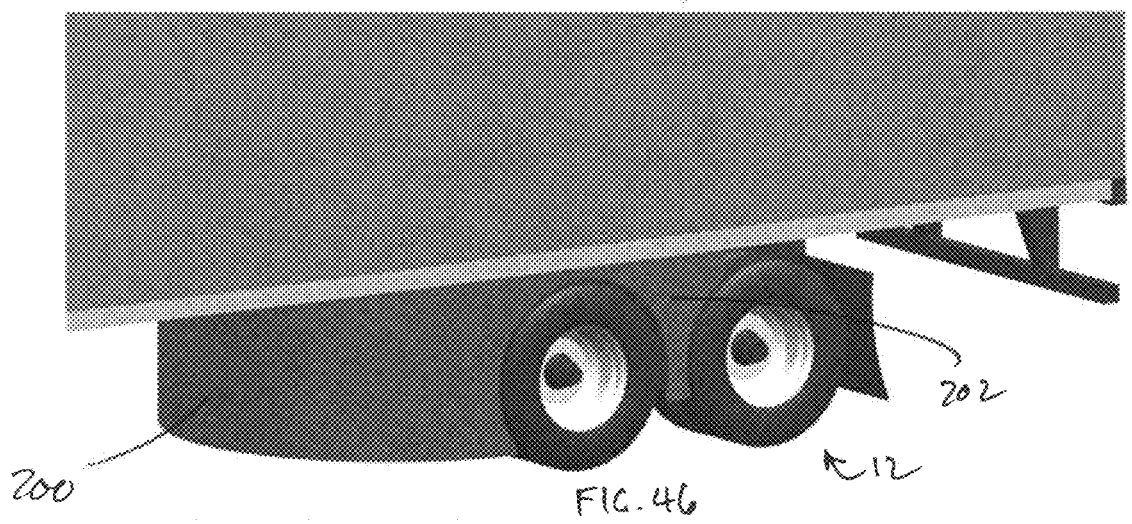
Figure 47:
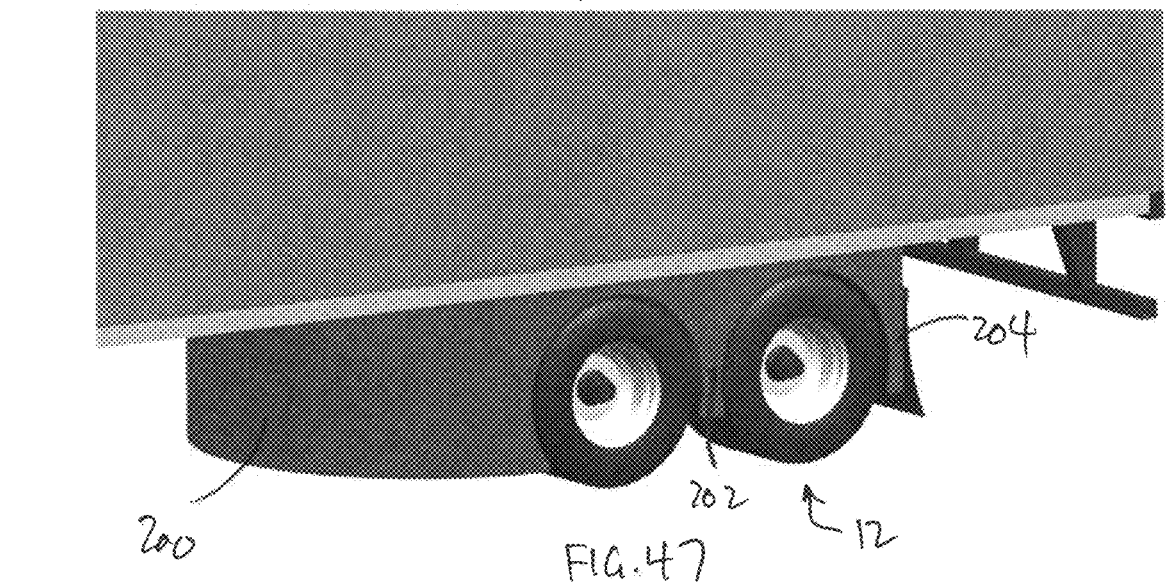
Figure 48:
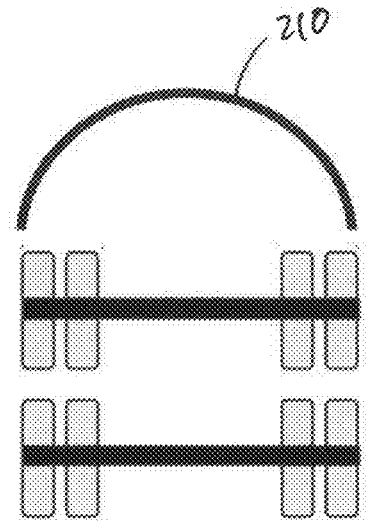
FIGS. 48-53 are simplified schematic illustrations illustrating possible configurations for an air deflector, according to embodiments of the invention.
Figure 49:
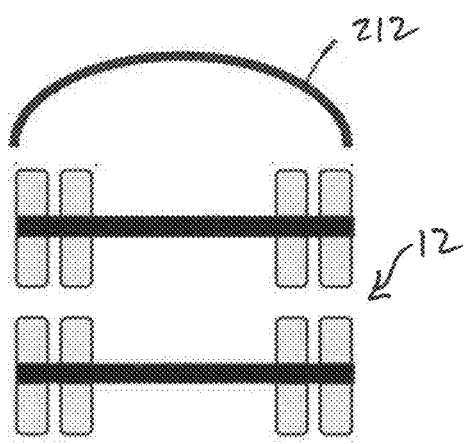
Figure 50:
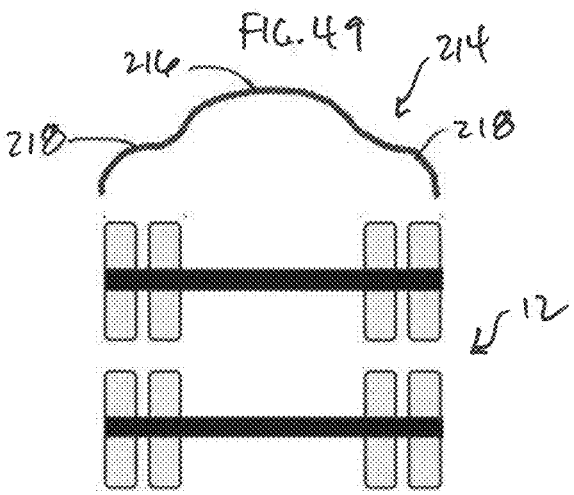
Figure 51:
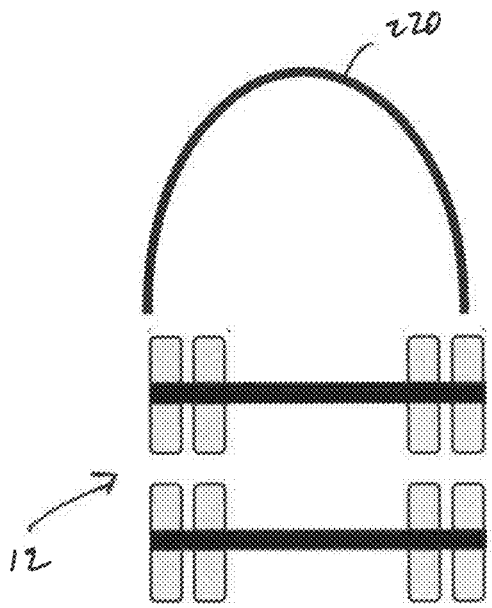
Figure 52:
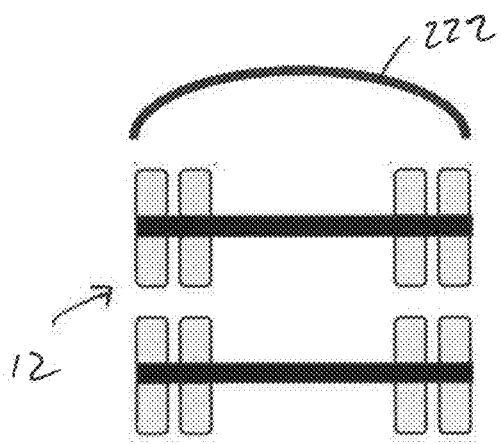
Figure 53:
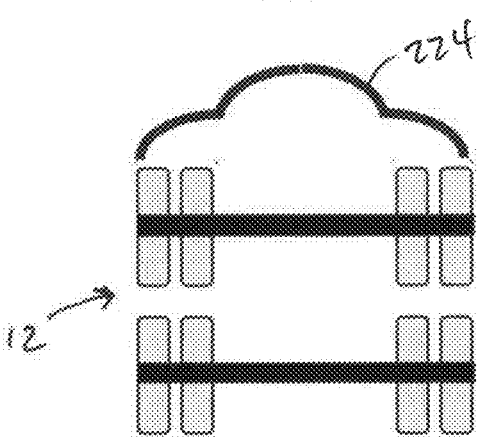

FIGS. 45-47 show various configurations for the air deflector including, for example, where the deflector 200 is positioned only in front of the tires (FIG. 45), extends and includes a portion 202 between the tires (FIG. 46), and includes a portions 202, 204 in front of, in between, and behind the tires (FIG. 47) for increased aerodynamic benefit.

Turning now to FIGS. 48-53 various possible configurations for the deflector 200 are illustrated. As shown therein, the deflector may be a semi-circular deflector 210, a bowed deflector 212, a stepped deflector 214 having a nose portion 216 and opposed wing portion 218, a sharp-nosed deflector 220, a dull or shallow-nosed deflector 222, and an alternative stepped deflector 224. These devices all work in generally the same manner, but are slight shape variations on the common idea of deflecting airflow around the entire rear tandem set and tires. These illustrations aren't intended to be all inclusive, and other shapes and configurations are certainly possible.

Figure 54:
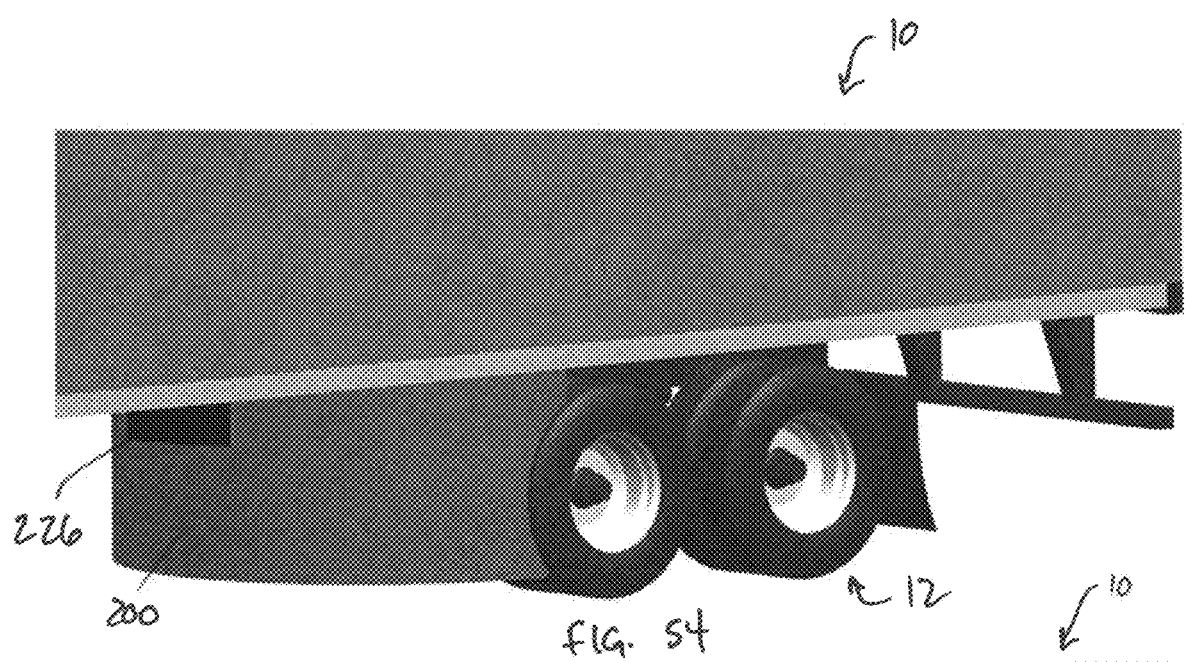
FIGS. 54-56 are enlarged perspective illustrations of alternative air deflector configurations, according to yet other embodiments of the invention.
Figure 55:
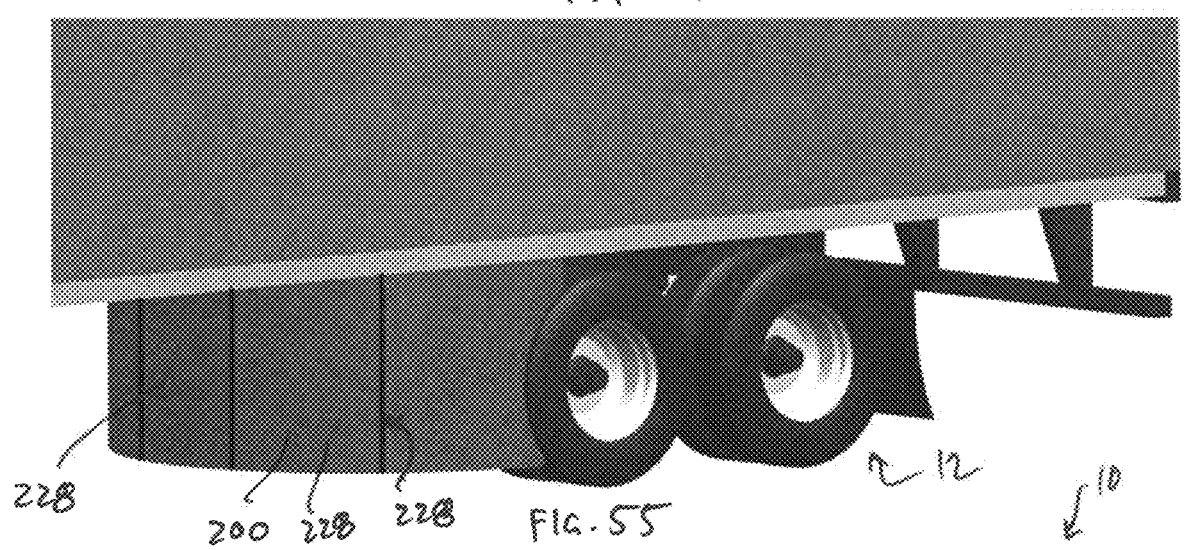
Figure 56:
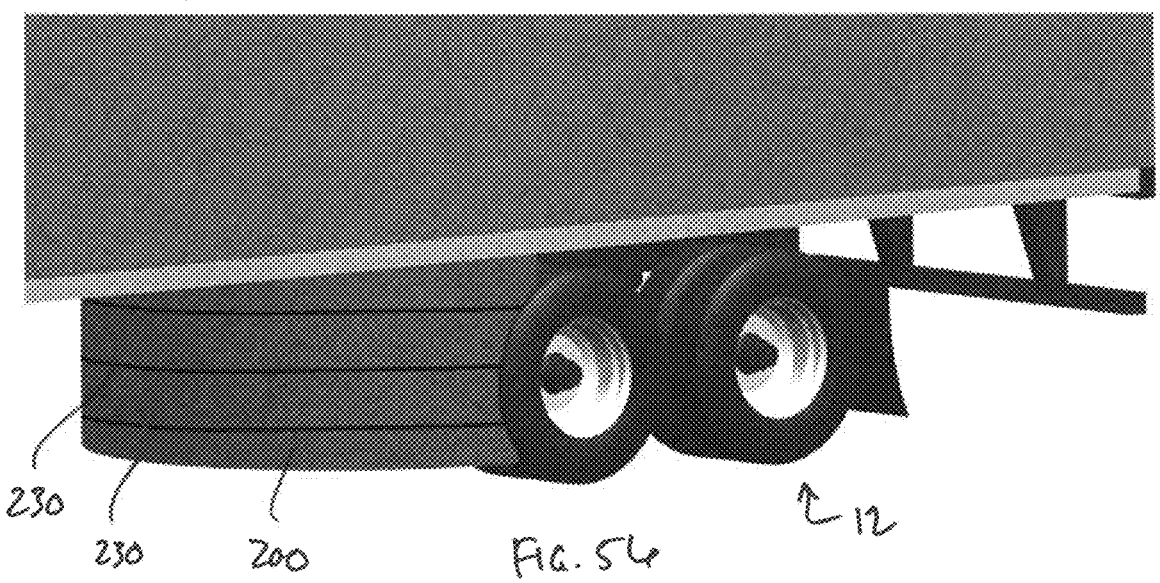

As illustrated in FIG. 54, in certain embodiments, the deflector 200 may include one or more apertures 226, windows, slots or the like for aerodynamic improvement or to allow truck or trailer hoses or other equipment to pass through. These apertures, windows and slots could also allow maintenance access for servicing the trailer or tandems. The hole 226 is shown rectangular in shape, but could be any shape, and there could be multiple holes. As shown in FIGS. 55 and 56, in an embodiment, the deflector may formed from a plurality of vertical segments 228 or horizontal segments 230, where the deflector would act as a solid shape for aerodynamic performance, but be built in segments for ease of manufacture, service, or assembly. Where horizontal segments 230 are utilized (FIG. 56) the deflector height could be changed for ease of service or assembly. This would work like a telescoping curtain, and still be mounted to the tandems for optimum placement in front of the tires given the ability to move with the tandems as they are adjusted for payload weight and location.

Figure 57:
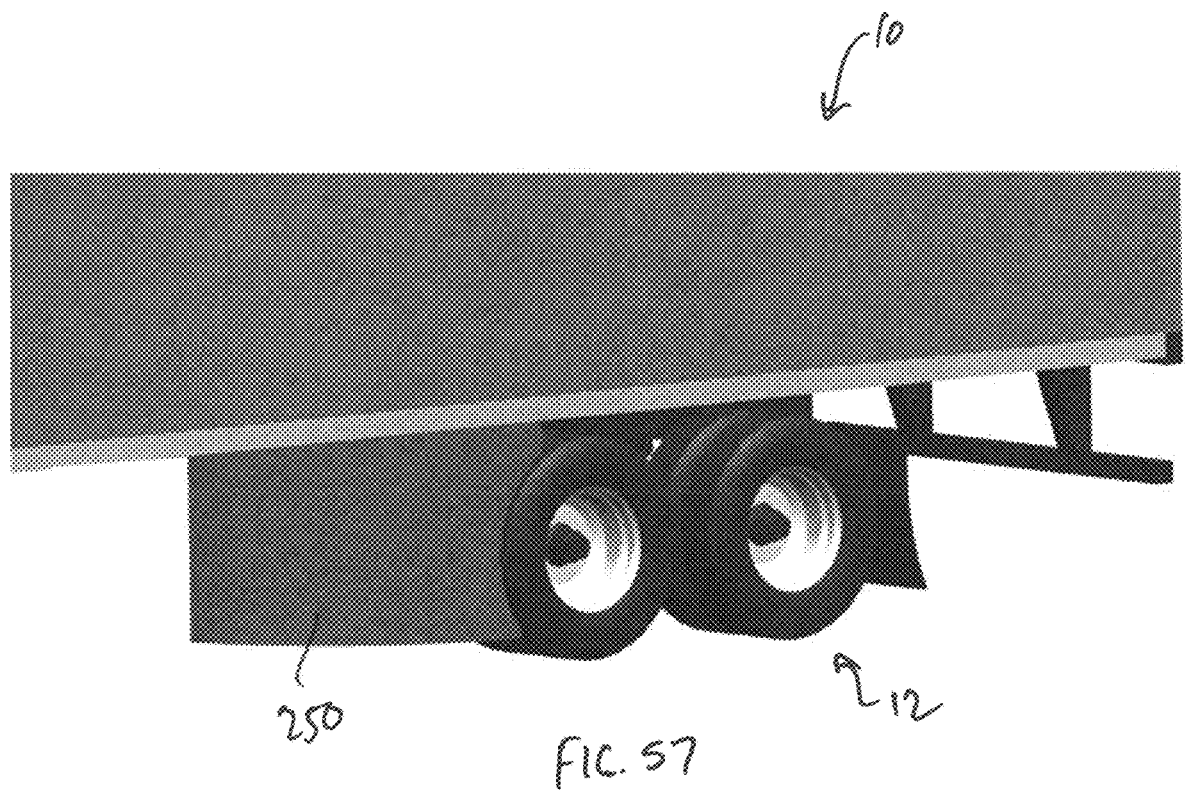
FIG. 57 is an enlarged perspective view of an alternative air deflector, according to an embodiment of the present invention.
Figure 58:
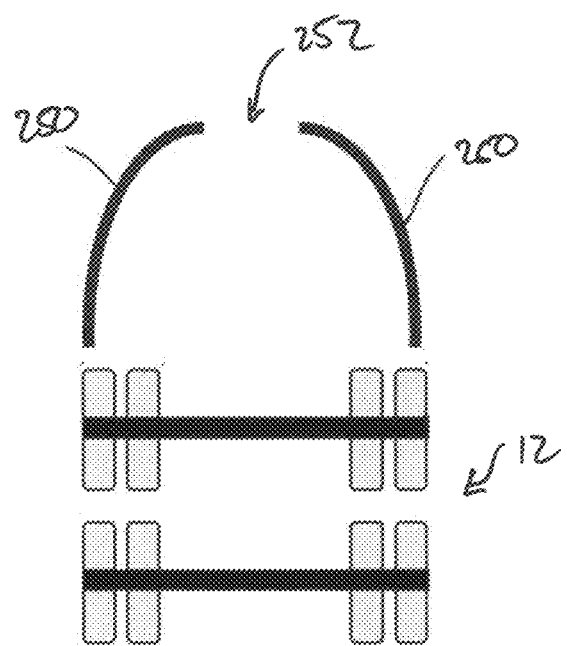
FIG. 58 is a top plan view of the air deflector of FIG. 57.

FIGS. 57 and 58 show a side deflector 250 with a gap 252 in the center for service or aerodynamic performance. The top view of FIG. 58 shows that there can be two deflectors 250 which, like all of the other concepts presented here, would be tandem mounted. The gap 252 in the middle can be optimized for aerodynamic performance or to leave a space for trailer hoses or other equipment to pass between. This space 252 could also be for ease of servicing the tandem or trailer.

Figure 59:
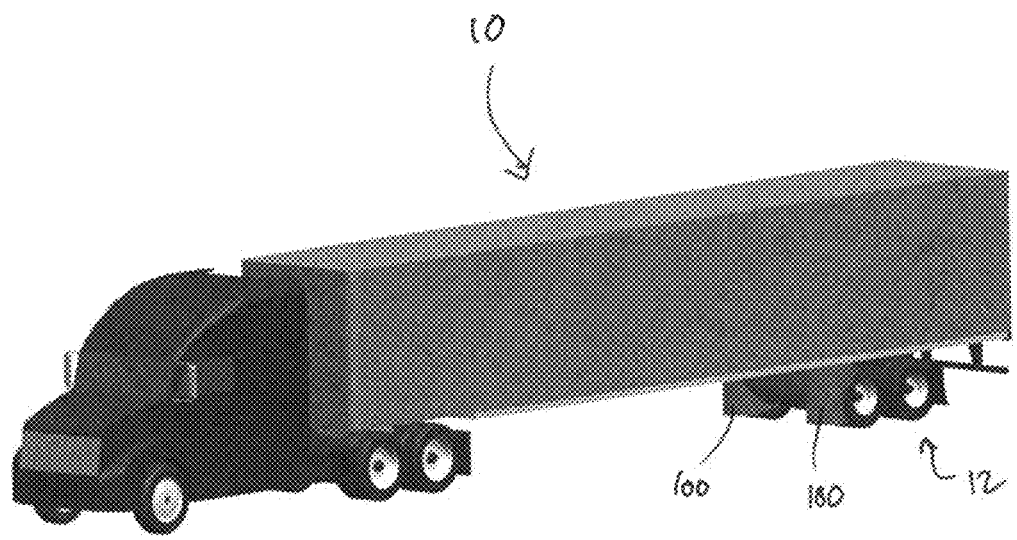
FIGS. 59-61 illustrate an exemplary apparatus for reducing the aerodynamic drag of a vehicle, shown in use with various types of vehicles.
Figure 60:
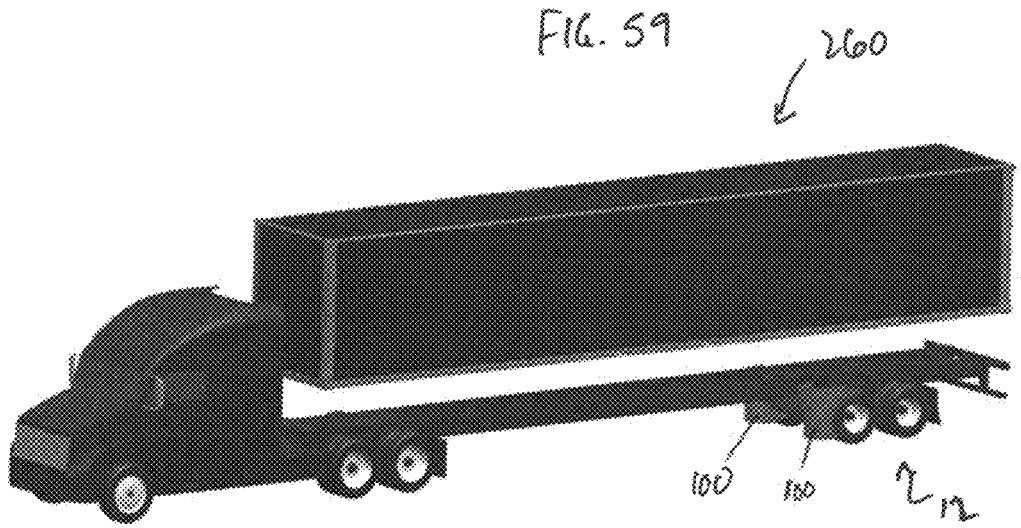
Figure 61:
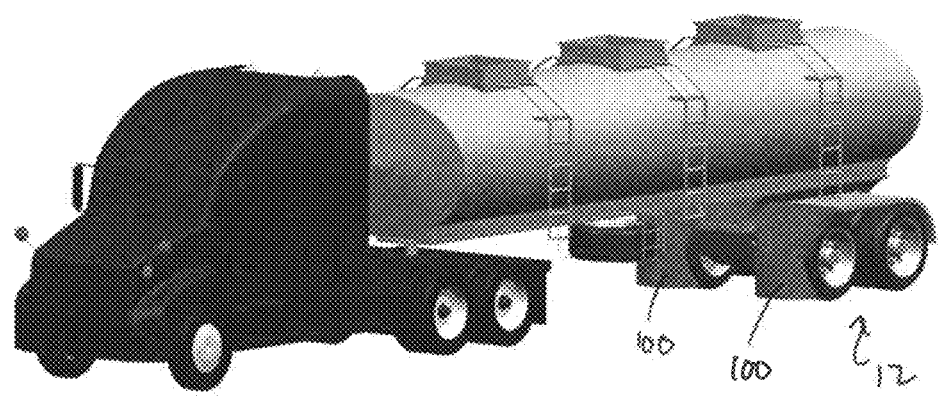

With reference to FIGS. 59-61, these figures illustrate that the present can be applied to a standard semi trailer 10, an intermodal chassis 260, and a tanker truck 270. Various modifications may be made to accommodate the specific physical structures that may differ between the different vehicles, but the devices would perform the same function, that is, to more efficiently direct flow around the rear tires and/or tandems of over-the-road trucks. Indeed, the present invention is equally applicable to any type of truck, and can be used to facilitate the deflection of air flow around any desired components or structures.

Figure 62:
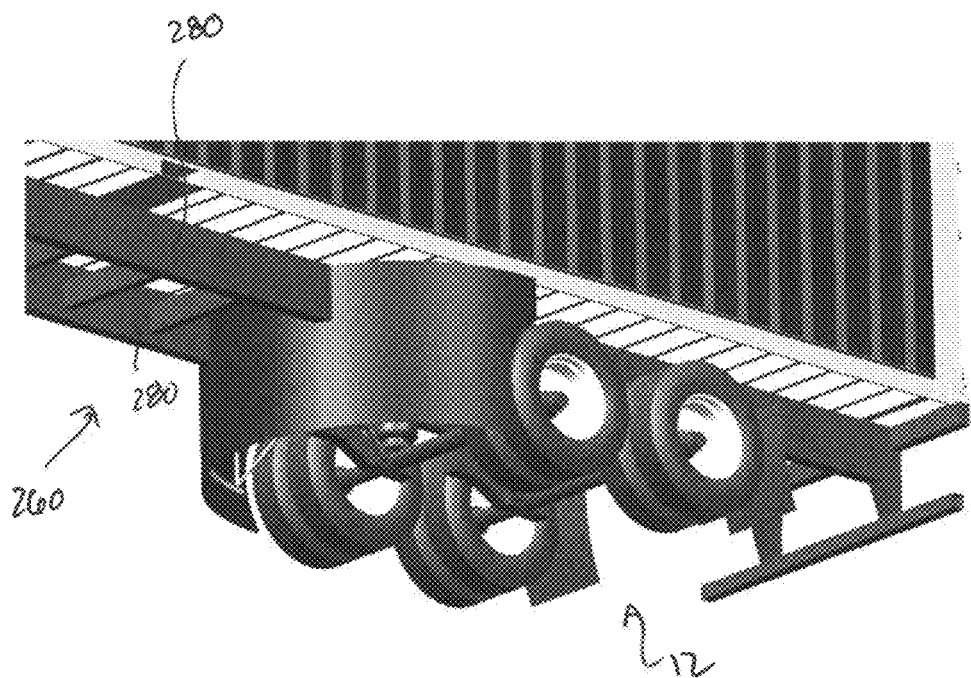
FIGS. 62 and 63 are perspective illustrations shown an air defector or curtain of the present invention deployed on an intermodal chassis trailer.
Figure 63:
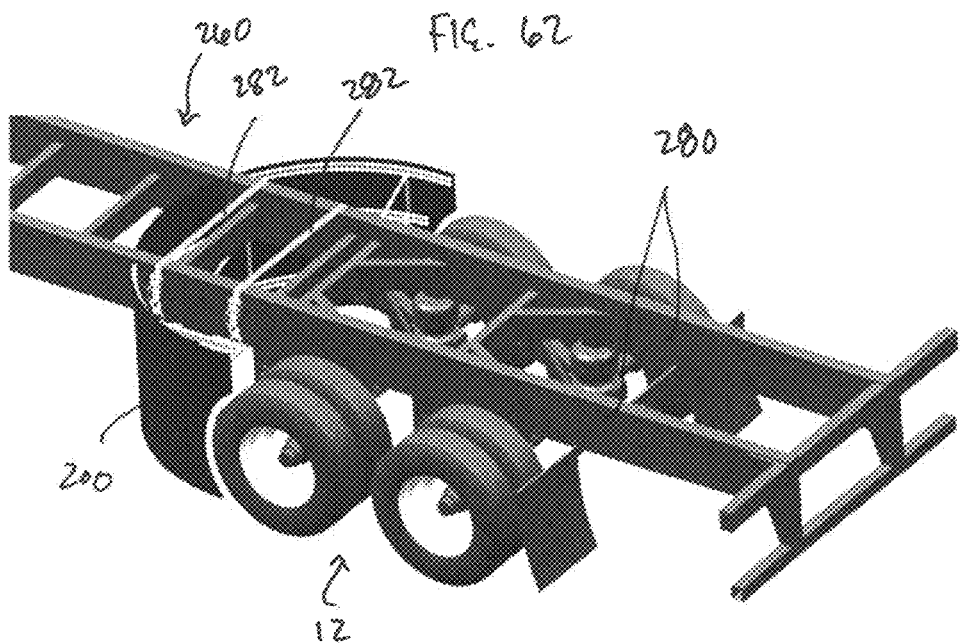
Figure 64:
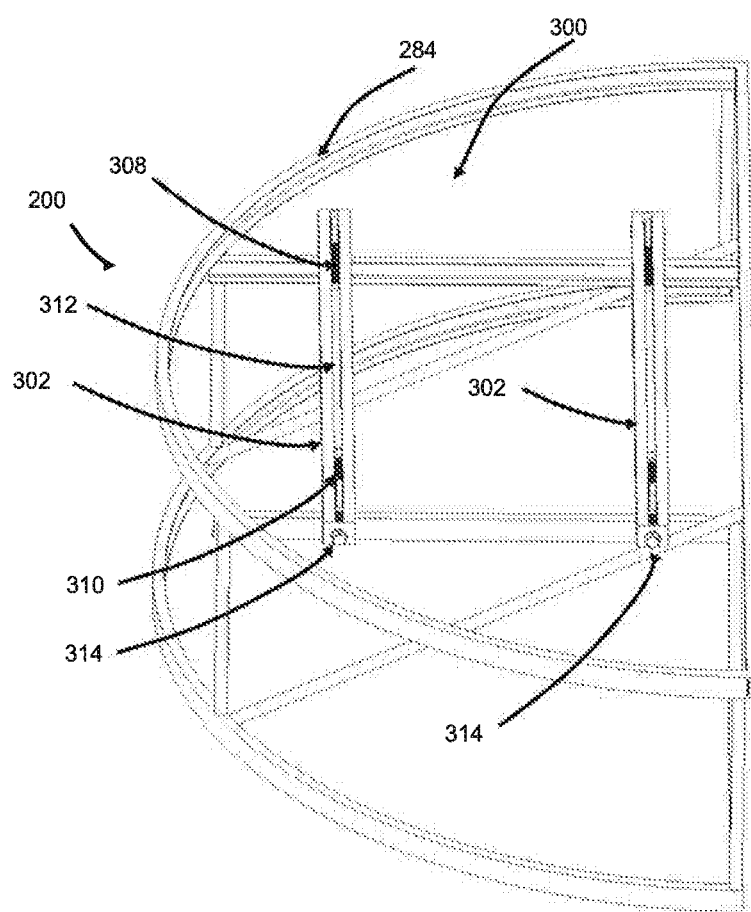
FIGS. 64-72 are various illustrations of an air deflector having a mounting mechanism for connection to an intermodal chassis, according to an embodiment of the present invention.
Figure 65:
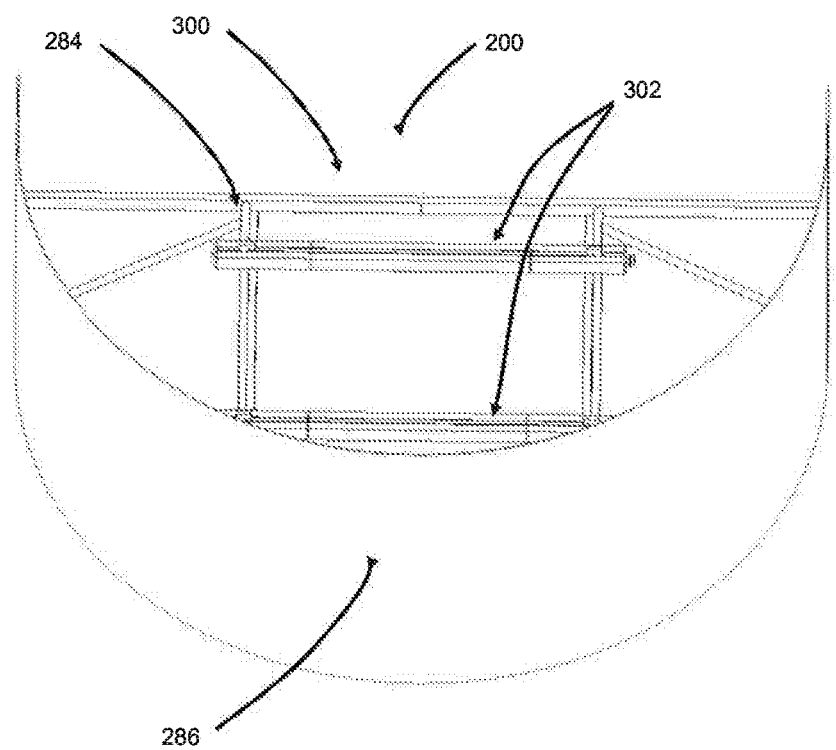

With reference to FIGS. 62 and 63, the air deflector or skirt 200 may be attached to the frame rails 280 of an intermodal chassis trailer 260 (i.e., rather than, or alternative to, the tandems or associated structures). For example, as shown in FIG. 63, the air deflector 200 may be attached to the frame rails 280 utilizing straps 282, although other means of attachment such as U-bolts and the like may also be utilized without departing from the broader aspects of the invention.

FIGS. 64-72 are various illustrations of the air deflector 200, showing a mounting mechanism 300 for connection to the frame rails 280 of an intermodal chassis 260, according to an embodiment of the present invention. As shown therein, the air deflector 200 includes an internal frame structure 284 or skeleton that defines the shape of the air deflector, and which supports one or more deflector panels or a skirt 286 that are attached thereto for diverting the flow of air around the tandems, axles, brake lines and the like. The mounting mechanism 300 includes a pair of transverse tubes 302 each having an upwardly facing slot 304. Within each tube 302 is a pair of opposed, upstanding fingers 306 that extend from opposite ends of the slot 304. The fingers 306 are mounted on opposed screws 308, 310 which are interconnected by a shaft 312. Screw 308 is one of right hand threaded or left hand threaded, while screw 310 is the other of right hand threaded or left hand threaded. One of the screws, for example screw 310, is connected to a drive mechanism 314 such as a hex head or the like at a distal end of the tube 302.

Figure 66:
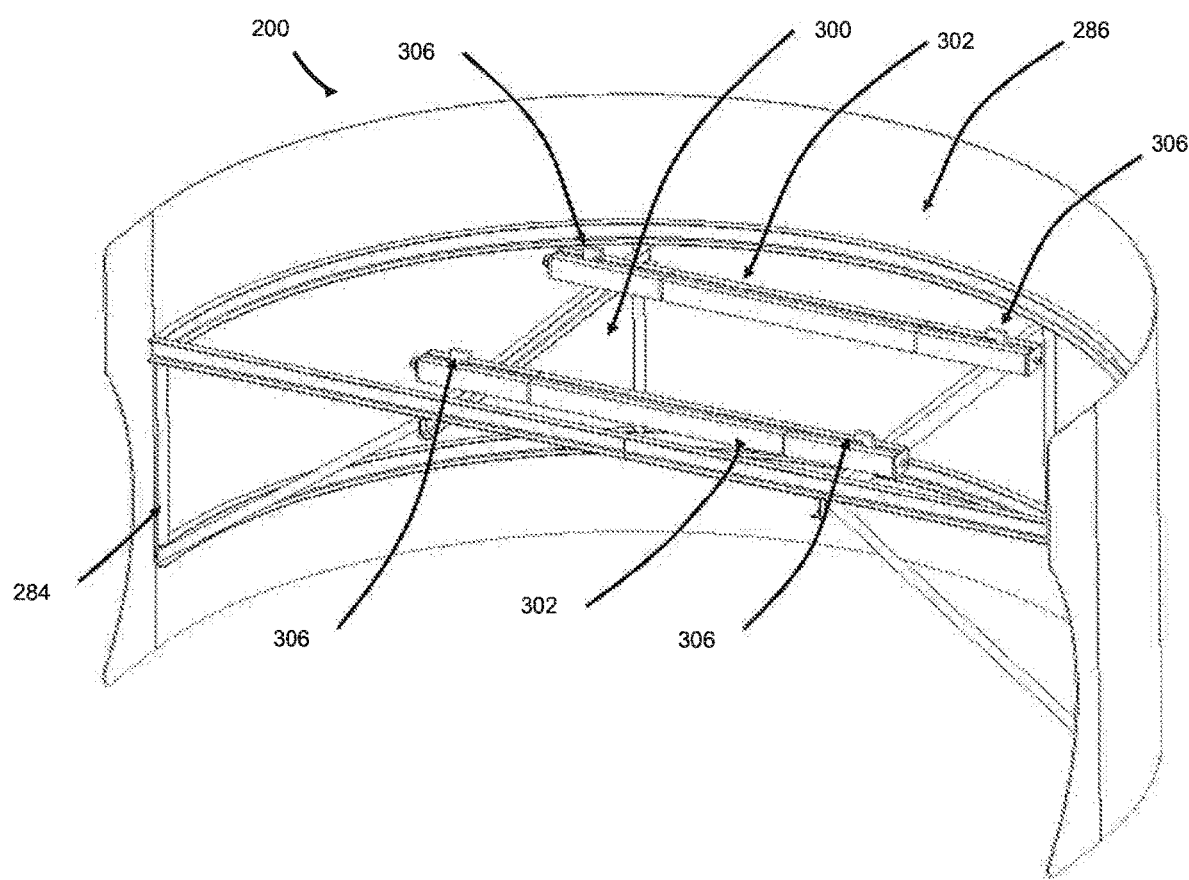
Figure 67:
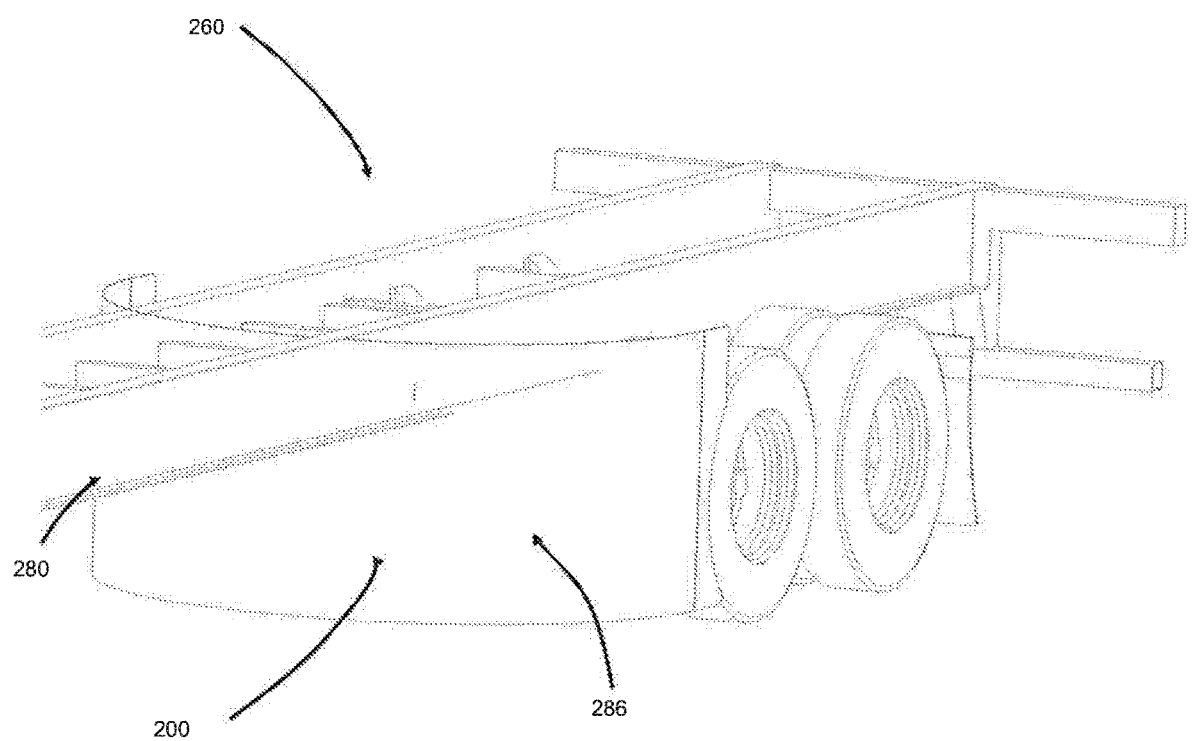
Figure 68:
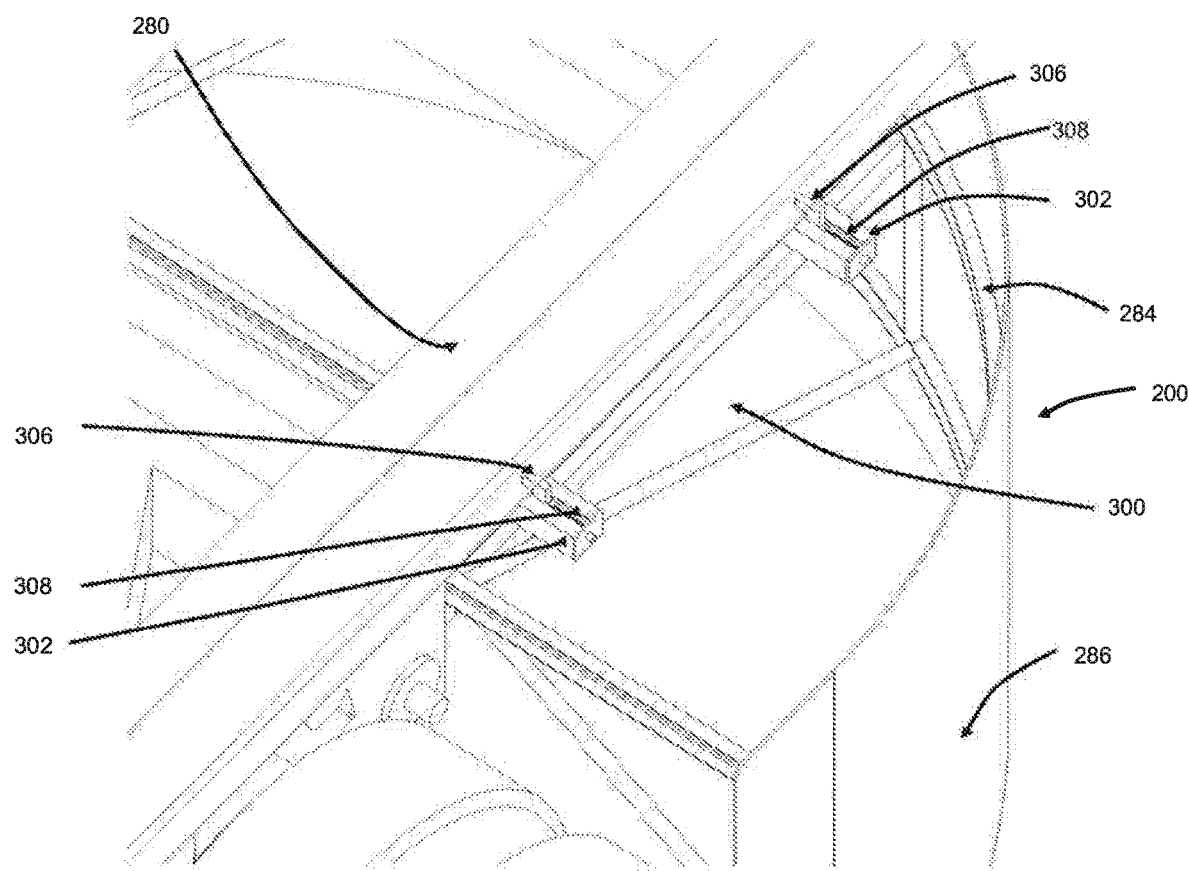
Figure 69:
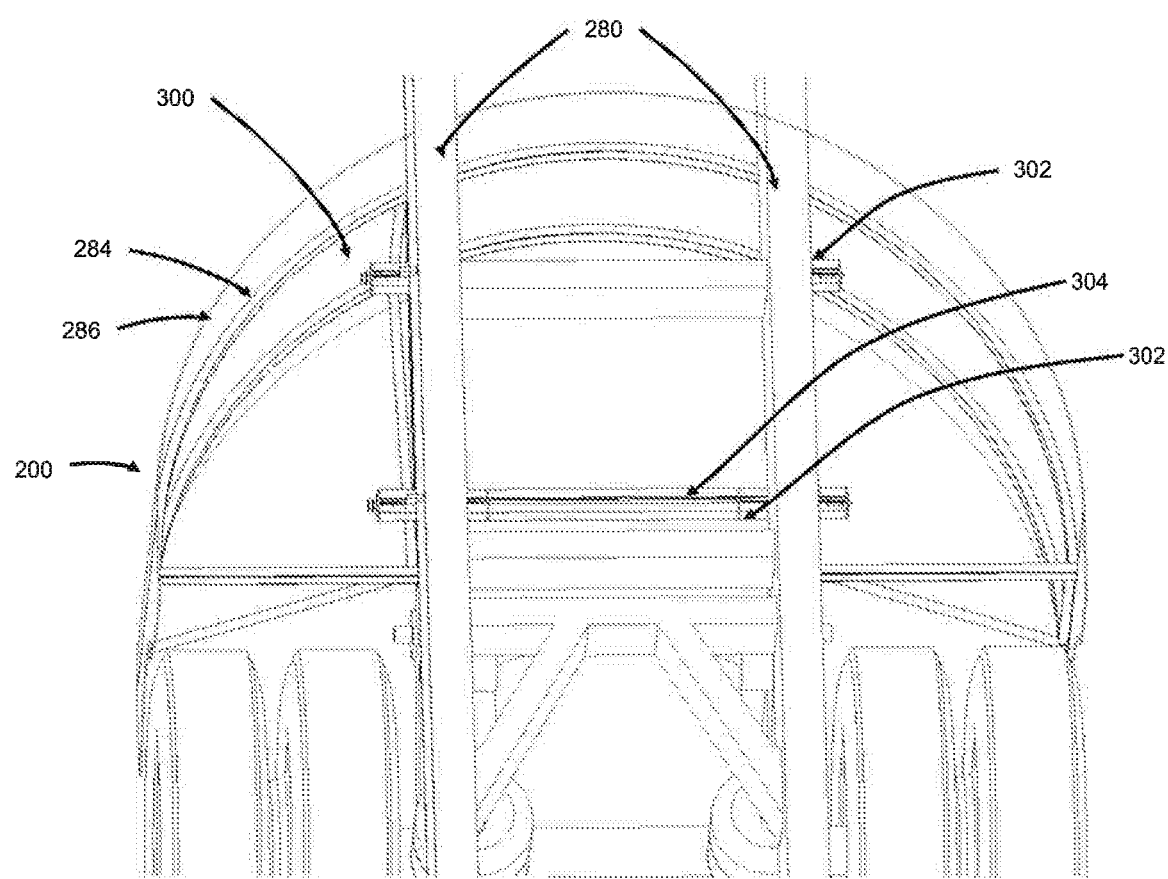
Figure 70:
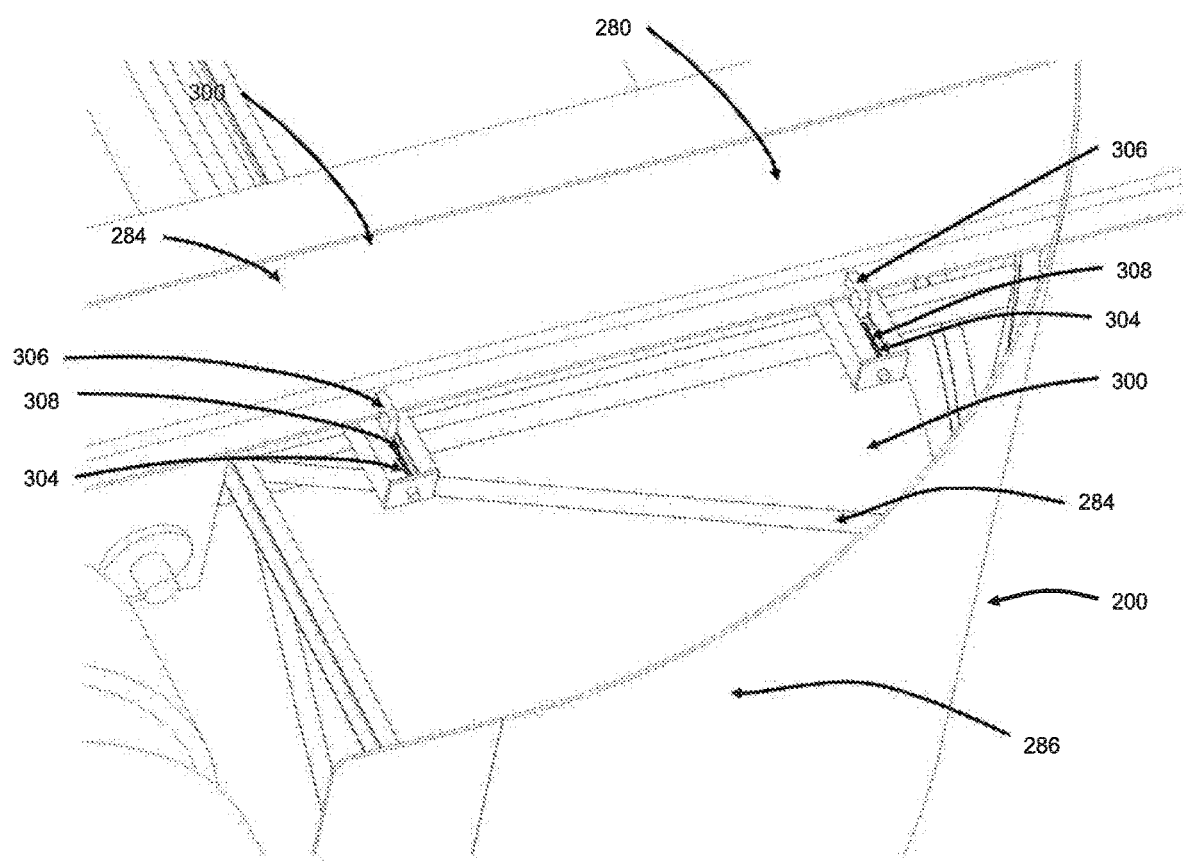
Figure 71:
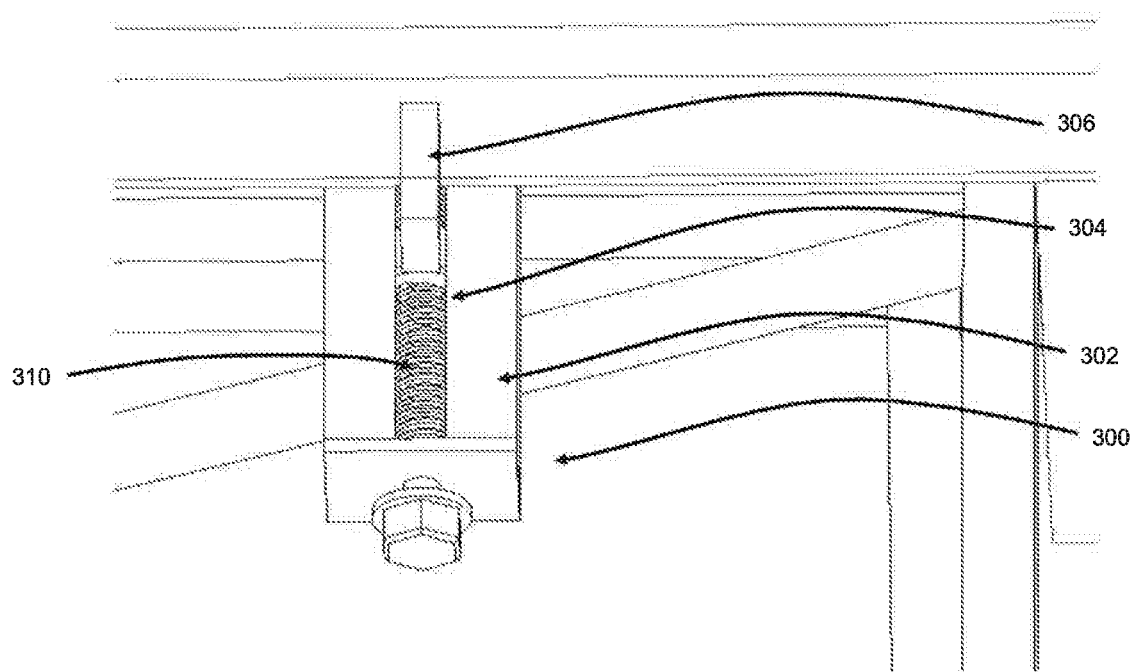
Figure 72:
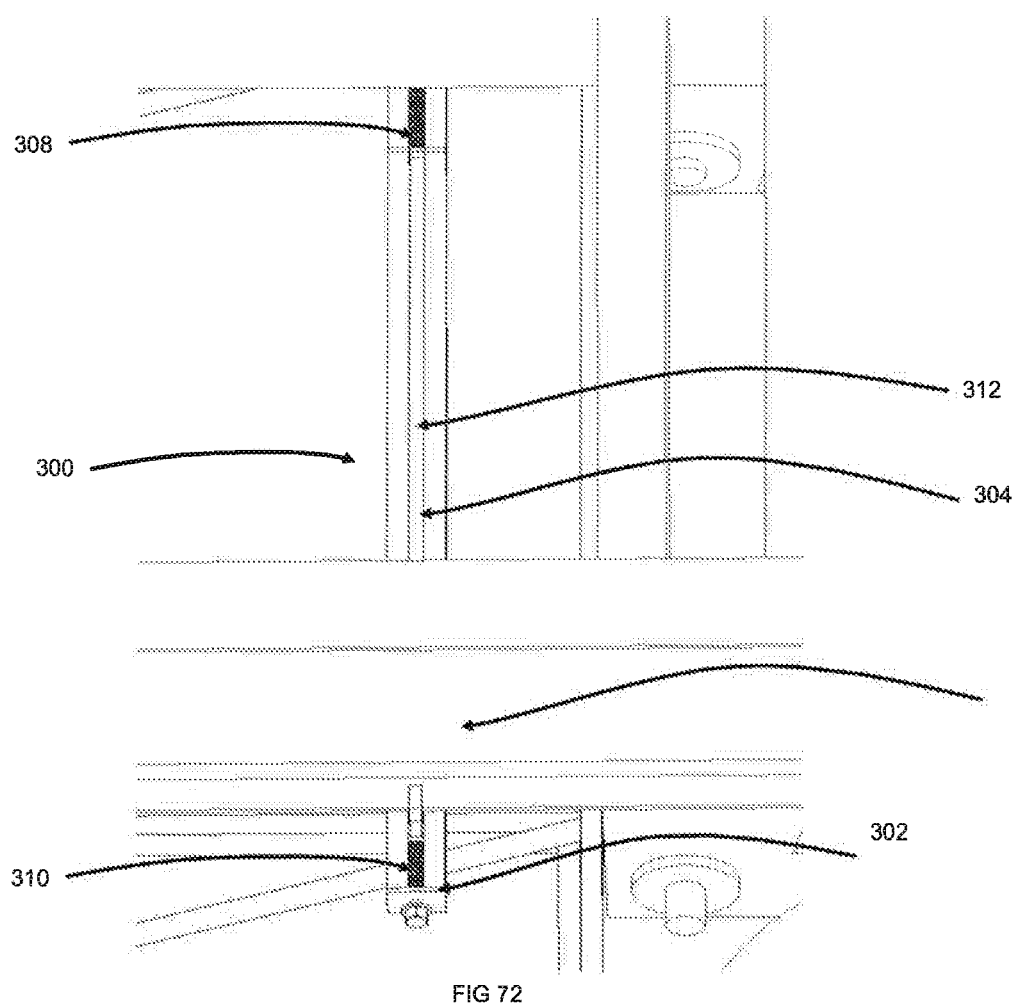

As best shown in FIGS. 66, 68 and 70, the fingers 306 are generally L-shaped, having a leg that protrudes horizontally inward toward the center line of the chassis 260. In operation, the air deflector 200 may be positioned between the frame rails 280 of an intermodal chassis 260 and then moved upwardly against the frame rails 280. The drive mechanism 314 may then be rotated in one direction, which causes the opposed fingers 306 of each tube 302 to move inwardly, engaging the lower flange 320 of the frame rails 280 on each side of the chassis 260 and securing the air deflector 200 to the frame rails 280, as best shown in FIGS. 68 and 70. Importantly, the oppositely threaded screws 308, 310, interconnected by shaft 312, allows the air deflector 200 to be installed from one side of the trailer in an efficient and quick manner. When it is desired to remove the air deflector 200, the drive mechanism 314 of each tube 302 may simply be rotated in the opposite direction, which pulls the fingers 306 outwardly and out of engagement with the frame rails 280, thereby decoupling the air deflector 200 from the intermodal chassis 260.

This mounting mechanism 300 therefore provides a quick and easy means of coupling and decoupling an air deflector to an intermodal chassis. Indeed, there is no need to separately work from both sides of the chassis, and all that is required to secure the air deflector is to rotate 2 screws using, for example, a wrench or drill. The present invention therefore allows for the mounting of an air deflector on intermodal chassis trailers, which has heretofore not been feasible.

Figure 73:
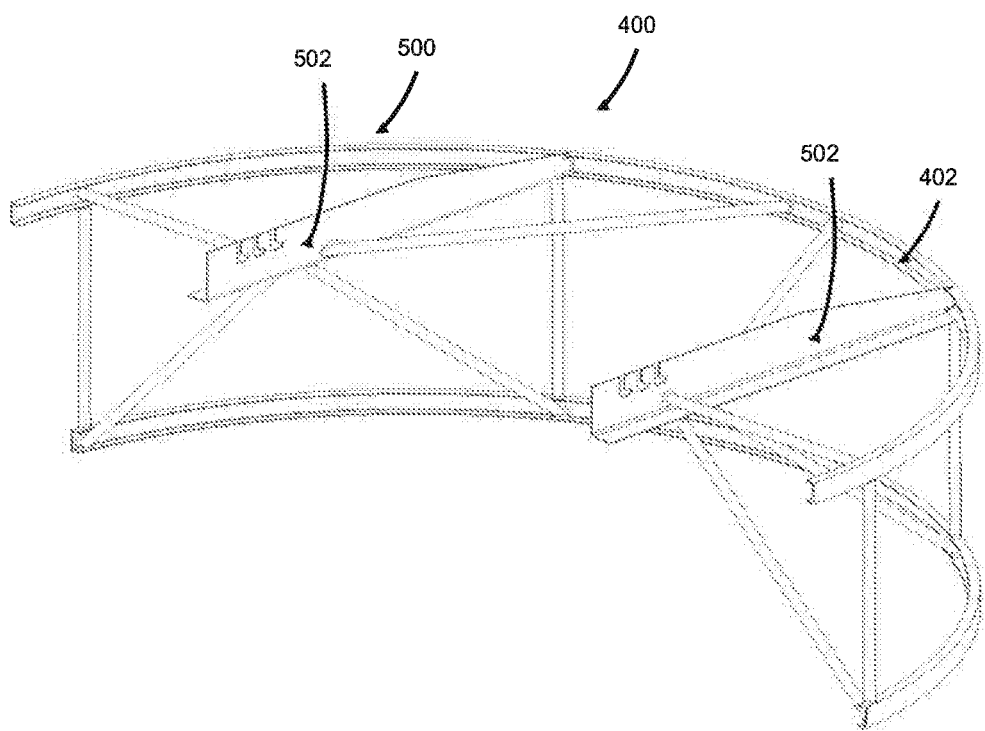
FIGS. 73-75 are various illustrations of a quick mounting mechanism for mounting an air deflector to a semi trailer tandem assembly, according to an embodiment of the invention.

Turning finally to FIG. 73, an air deflector 400 having a mounting mechanism 500 for mounting to a standard tractor trailer according to an embodiment of the present invention is illustrated. The air deflector 400 may take any shape described herein, such as that of air deflector 200, and like air deflector 200, includes an internal frame structure 402 or skeleton that defines the shape of the air deflector, and which supports one or more deflector panels or a skirt that are attached thereto for diverting the flow of air around the tandems, axles, brake lines and the like. As best shown in FIG. 83, the mounting mechanism 500 includes a pair of opposed plate-like mounting bars 502 that extend parallel to a direction of travel of the vehicle and which are spaced apart a distance approximately equal to a distance between opposed rails 504 of the trailer upon which the tandems 12 may be selectively positioned.

Figure 74:
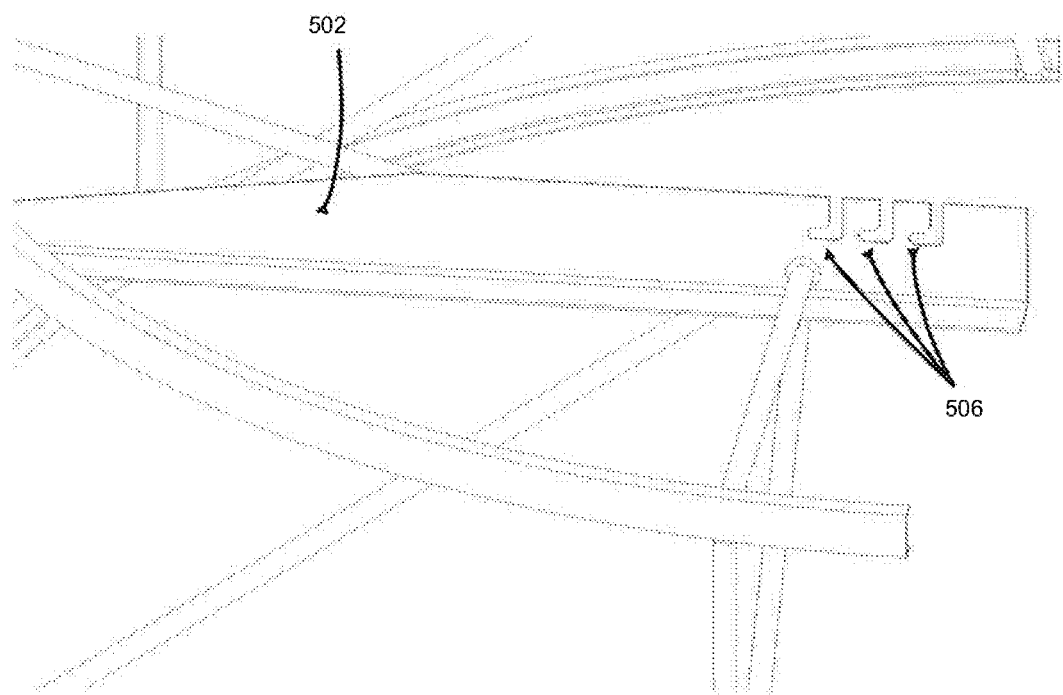
Figure 75:
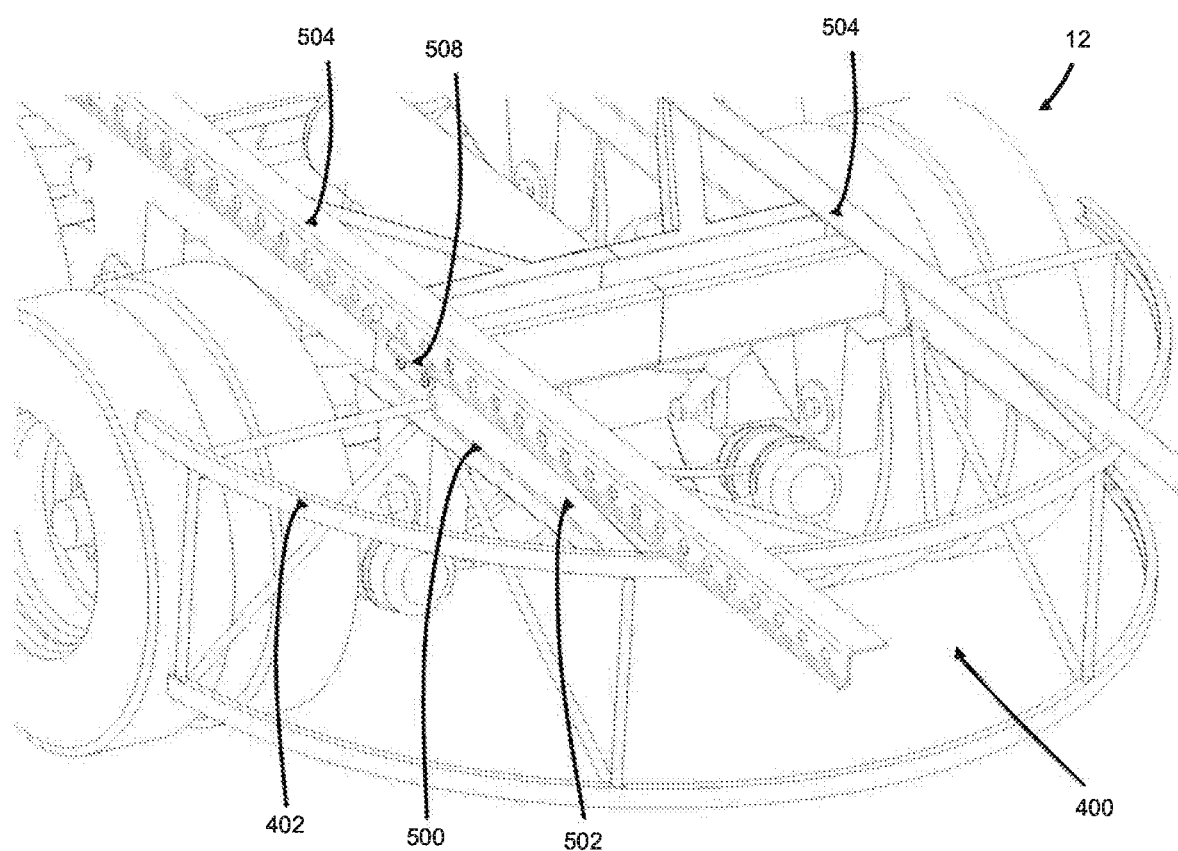

FIG. 74 is a detail view of the mounting bars 502. As illustrated therein, the bars 502 may have a number of longitudinally spaced, L-shaped slots 506. With reference to FIG. 75, standard trailer tandems are guided and positioned on a standard trailer via frame rails 504. The tandems are affixed to the trailer frame rails by a C-shaped channel member 508. Air deflector frame 400 is mounted to the trailer tandems by loosening the bolts that secure standard C-shaped channel member 508, then sliding frame member 502 between member 508 and the tandem frame structure, allowing the slots 506 to engage the bolt studs securing C-channel 508. After slots 506 have been engaged with attachment bolts securing standard C-shaped channel member 508, the attachment bolts are re-tightened, securing air deflector frame 400 to the trailer tandem frame. Importantly, this design allows for the quick and easy attachment and detachment of the air deflector to the standard trailer tandems, and allows for easy repositioning of the deflector, if desired.

As discussed above, several aerodynamic shapes for both the center and tire air deflectors are possible. The means of attachment to the tandem structure would not impact the aerodynamic performance. The optimal attachment approach would be selected based on initial cost and expected robustness and longevity, as well as time, effort, tools and skills required to install. A low cost, simple approach that is robust and permanent (or allow easy replacement if desired) and that could be performed remotely by an unskilled assembler would be most optimal.

These aerodynamic attachments could be made from a variety of materials (metal, composites, plastic, rubber, lightweight foam, wood, etc.) as the material would not impact the aerodynamic performance. The optimal material would be selected based on initial cost and expected robustness and longevity. As discussed above, the aerodynamic attachments could also be made of either solid material or hollow shapes for reduced weight and cost. It is contemplated that the any of the air deflectors of the present invention may be outfitted with running lights or reflective surfaces to aid in overall vehicle safety.

Importantly, by mounting the deflector(s) directly to the tandems that are themselves movable between various positions along the trailer depending on the cargo carried therewithin, the position of the air deflector(s) relative to the rear tires of the vehicle remains constant regardless of the position of the tandems on the trailer. Accordingly, the diversion of airflow around the rear tires of the vehicles is not changed even if the position of the tandems is altered, in contrast to existing side skirt and other devices. That is, while movement of the tandems can compromise the proper operation of existing side skirts and other devices due to the creation of a larger or smaller gap between the trailing edge of such existing devices and the rear wheels, the present invention is able to maintain optimal spacing to achieve a substantially constant and uniform reduction in aerodynamic drag, regardless of tandems position.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A system for reducing the aerodynamic drag of a vehicle, comprising:
at least one forward air deflector configured for attachment to one of a tandem of a the vehicle or frame rails of the vehicle, the tandem including at least a first axle having opposed left and right ends and at least one tire mounted to each of the left end and the right end, and a second axle rearward of the first axle and having opposed left and right ends and at least one tire mounted to each of the left end and the right end;
wherein the at least one leading air deflector is positionable forward of the tires of the first axle and is shaped so as to deflect a flow of air laterally around the tires of the vehicle to reduce aerodynamic drag;
wherein the at least one forward air deflector includes a mounting mechanism for attaching the air deflector to the frame rails of the vehicle, the mounting mechanism including:
at least one transverse tube; and
a pair of upstanding fingers extending upwardly from opposed ends of the transverse tube, the upstanding fingers being selectively movable inwardly towards a center line of the vehicle and towards one another to engage a flange on the frame rails of the vehicle, and outwardly away from one another to disengage from the frame rails of the vehicle.

2. The system of claim 1, wherein:
the tandem is positionable at various longitudinal locations along the vehicle; and
wherein a spacing between the leading air deflector and the tires of the first axle remains substantially constant regardless of a position of the tandem on the vehicle.

3. The system of claim 2, wherein:
the at least one leading air deflector has one of a curved, triangular or angled shape.

4. The system of claim 2, further comprising:
at least one trailing air deflector configured for attachment to the tandem rearward of the tires of the second axle;
wherein a spacing between the trailing air deflector and the tires of the second axle remains substantially constant regardless of a position of the tandem on the vehicle.

5. The system of claim 2, wherein:
the at least one leading air deflector has a trailing edge that having a shape that corresponds to a contour of the tires of the first axle.

6. The system of claim 2, wherein:
the at least one leading air deflector is a pair of leading air deflectors positionable forward of the tires of the first axle; and
wherein the system further includes a central air deflector that extends between the pair of leading air deflectors and is configured to deflect the air flow downwardly away from the first axle and second axle to reduce aerodynamic drag.

7. The system of claim 1, wherein:
the upstanding fingers are linked together so as to be moved between the inward position and the outward position simultaneously and from a single side of the vehicle; and
wherein the mounting mechanism includes a drive mechanism actuatable to move the fingers between the inward position and the outward position.

8. An apparatus for reducing the aerodynamic drag of a vehicle having a trailer and a tandem configured for attachment to the trailer, the apparatus comprising:
an air deflector having a nose and trailing edges located rearward of and spaced laterally from the nose; and
a mounting mechanism attached to the air deflector and providing a means of attaching the air deflector to one of a tandem of the vehicle and frame rails of the vehicle.

9. The apparatus of claim 8, wherein:
the mounting mechanism provides a means of attaching the air deflector to the frame rails of the vehicle tandem and includes at least one L shaped slot in a mounting plate configured to engage existing standard trailer tandem attachment bolts allowing for rapid installation of the air deflector to the tandem frame rails;
wherein the air deflector is positionable upwind from rear tires of the vehicle and is configured to deflect a flow of air laterally around the rear tires of the vehicle to reduce aerodynamic drag of the vehicle.

10. The apparatus of claim 8, further comprising:
the mounting mechanism provides a means of attaching the air deflector to the frame rails of the vehicle, where the vehicle is an intermodal chassis trailer, the mounting mechanism including:
at least one transverse member; and
a pair of upstanding fingers extending upwardly from opposed ends of the transverse member, the upstanding fingers being selectively movable inwardly towards a center line of the vehicle and towards one another to engage a flange on the frame rails of the vehicle, and outwardly away from one another to disengage from the frame rails of the vehicle.

11. The apparatus of claim 10, wherein:
the upstanding fingers are linked together so as to be moved between the inward position and the outward position simultaneously and from a single side of the vehicle; and
wherein the mounting mechanism includes a drive mechanism actuatable to move the fingers between the inward position and the outward position.

12. A system for reducing the aerodynamic drag of a vehicle having a trailer, the trailer having at least one frame rail for supporting a load, the system comprising:
at least one forward air deflector configured for attachment to the at least one frame rail of the trailer and positionable forward of tires of the trailer, the at least one forward air deflector being shaped so as to deflect a flow of air laterally around the tires to reduce aerodynamic drag; and
a mounting mechanism attached to the at least one forward air deflector and providing a means of attaching the air deflector to the at least one frame rail of the trailer;
wherein the mounting mechanism includes an engagement member movable between a first position in which the engagement member is spaced from the at least one frame rail, and a second position in which the engagement member engages the at least one frame rail to secure the at least one forward air deflector in position forward of the tires.

13. The system of claim 12, wherein:
the mounting mechanism includes an actuator configured to move the engagement member between the first position and the second position.

14. The system of claim 12, wherein:
the mounting mechanism includes at least one transverse member and a pair of upstanding fingers extending upwardly from opposed ends of the transverse member, the upstanding fingers being selectively movable inwardly towards a center line of the trailer and towards one another to engage at least one flange on the at least one frame rail, and outwardly away from one another to disengage from the at least one frame rail.

15. The system of claim 12, wherein:
the engagement member is configured to clamp against the at least one frame rail to secure the at least one forward air deflector in position forward of the tires.

16. The system of claim 12, wherein:
the trailer is an intermodal chassis trailer or tanker truck trailer.

\* \* \* \* \*